United States Patent
Grewal et al.

(10) Patent No.: US 11,902,365 B2
(45) Date of Patent: *Feb. 13, 2024

(54) REGULATING ENQUEUEING AND DEQUEUING BORDER GATEWAY PROTOCOL (BGP) UPDATE MESSAGES

(71) Applicant: Juniper Networks, Inc., Sunnyvale, CA (US)

(72) Inventors: Ashutosh K. Grewal, Sunnyvale, CA (US); Jaihari V. Loganathan, Cupertino, CA (US); Kevin Wang, Acton, MA (US); Sanjay Khanna, Cary, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,804

(22) Filed: Oct. 4, 2022

(65) Prior Publication Data
US 2023/0027376 A1   Jan. 26, 2023

Related U.S. Application Data

(63) Continuation of application No. 16/900,762, filed on Jun. 12, 2020, now Pat. No. 11,496,559.

(51) Int. Cl.
*H04L 67/104* (2022.01)
*H04L 47/625* (2022.01)
(Continued)

(52) U.S. Cl.
CPC ............ *H04L 67/104* (2013.01); *H04L 43/16* (2013.01); *H04L 45/04* (2013.01); *H04L 47/30* (2013.01);
(Continued)

(58) Field of Classification Search
CPC .......................... H04L 45/04; H04L 47/6225
See application file for complete search history.

(56) References Cited

U.S. PATENT DOCUMENTS

| | | | |
|---|---|---|---|
| 8,520,522 B1 * | 8/2013 | Goldman | H04L 47/26 370/235 |
| 11,496,559 B1 * | 11/2022 | Grewal | H04L 41/0894 |

(Continued)

OTHER PUBLICATIONS

Co-pending U.S. Appl. No. 16/900,762, inventor Grewal; Ashutosh K., filed on Jun. 12, 2020.

*Primary Examiner* — Nicholas P Celani
(74) *Attorney, Agent, or Firm* — Harrity & Harrity, LLP

(57) ABSTRACT

A network device, associated with peer network devices, may receive policy information for a protocol; and compute a first update message based on information regarding a route associated with the policy information. The network device may determine that an upper utilization threshold for one or more of peer queues, associated with the peer network devices, is not satisfied; and write the first update message to the peer queues based on determining that the upper utilization threshold is not satisfied. The network device may compute a second update message based on the information regarding the route; determine that the upper utilization threshold for one or more of the peer queues is satisfied; and pause writing the second update message to the peer queues based on the upper utilization threshold being satisfied. The network device may permit the peer network devices to obtain data from corresponding ones of the peer queues.

19 Claims, 21 Drawing Sheets

(51) Int. Cl.
*H04L 43/16* (2022.01)
*H04L 45/02* (2022.01)
*H04L 47/30* (2022.01)
*H04L 47/62* (2022.01)

(52) U.S. Cl.
CPC ........ *H04L 47/627* (2013.01); *H04L 47/6225* (2013.01)

(56) References Cited

U.S. PATENT DOCUMENTS

| | | | |
|---|---|---|---|
| 2009/0073881 A1* | 3/2009 | Cui | H04L 47/30 370/235 |
| 2010/0046538 A1* | 2/2010 | Cabrera Escandell | H04L 47/122 370/419 |
| 2012/0331030 A1* | 12/2012 | Banks | G06F 9/544 709/204 |
| 2014/0112128 A1* | 4/2014 | Kwan | H04L 47/30 370/230 |
| 2017/0075734 A1* | 3/2017 | Raman | G06F 9/4881 |
| 2017/0134330 A1 | 5/2017 | Clark et al. | |
| 2017/0251077 A1* | 8/2017 | Kumar Eerpini | H04L 49/90 |
| 2020/0004607 A1 | 1/2020 | Mahajani et al. | |

\* cited by examiner

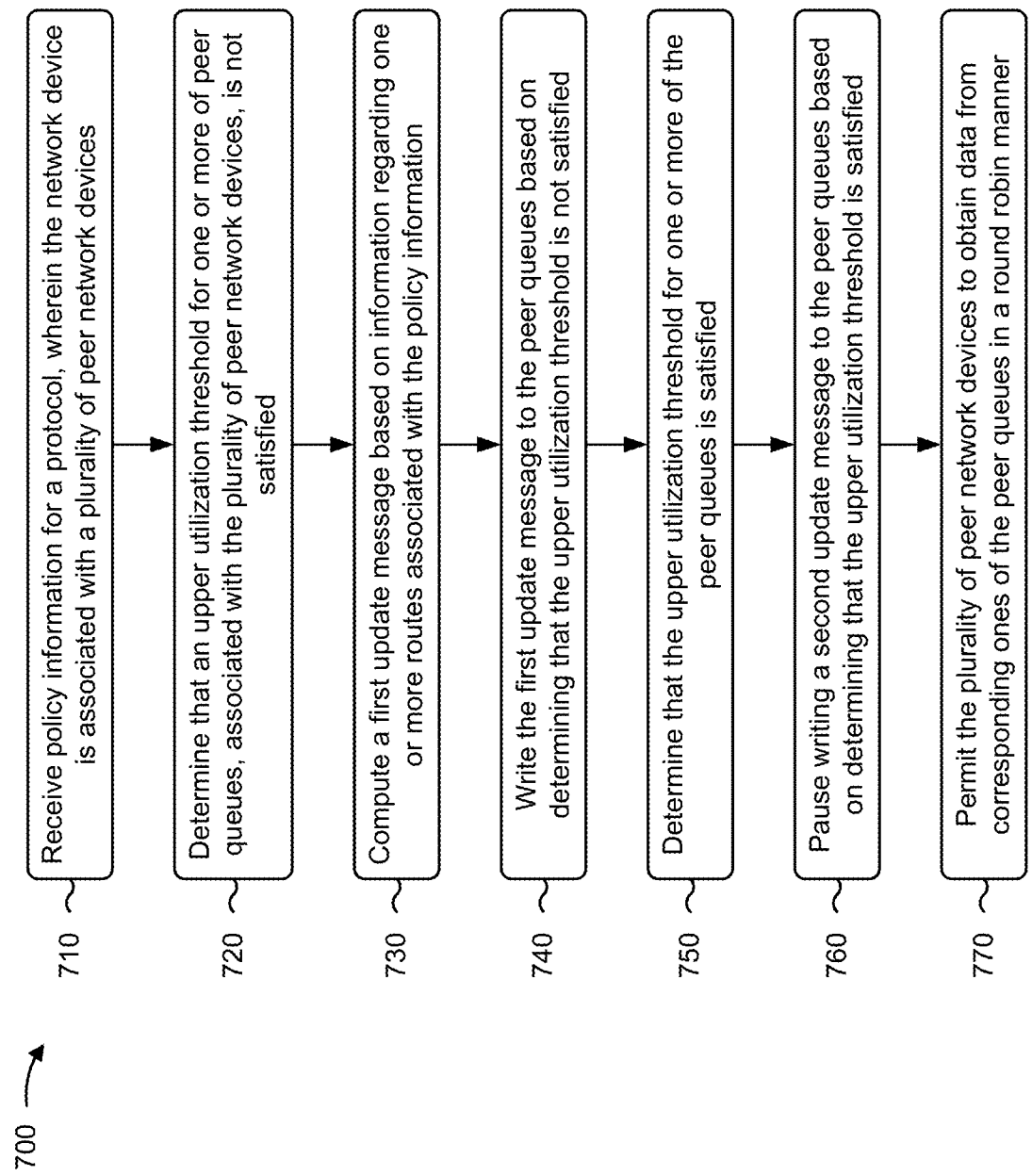

REGULATING ENQUEUEING AND DEQUEUING BORDER GATEWAY PROTOCOL (BGP) UPDATE MESSAGES

RELATED APPLICATION

This application is a continuation of U.S. patent application Ser. No. 16/900,762, filed Jun. 12, 2020, which is incorporated herein by reference in its entirety.

BACKGROUND

Border gateway protocol (BGP) may be utilized to exchange information associated with routing and reachability between peer network devices in a network. In this regard, BGP update messages may be used to send routing updates to peer network devices. A network device may generate a BGP update message for a group of peer network devices and may provide the BGP update message to the group of peer network devices to enable the peer network devices to update their routing information.

SUMMARY

In some implementations, a method includes determining, by a network device, that an upper utilization threshold for one or more of peer queues, associated with a plurality peer network devices, is not satisfied, the plurality of peer network devices being associated with the network device; computing, by the network device, a first update message based on information regarding one or more routes associated with policy information for a protocol, the first update message being generated based on determining that the upper utilization threshold is not satisfied; writing, by the network device, the first update message to the peer queues based on determining that the upper utilization threshold is not satisfied; determining, by the network device, that the upper utilization threshold for one or more of the peer queues is satisfied; and pausing, by the network device, writing a second update message to the peer queues based on determining that the upper utilization threshold is satisfied.

In some implementations, a network device includes one or more memories; and one or more processors to: receive policy information for a protocol, wherein the network device is associated with a plurality of peer network devices; determine that an upper utilization threshold for one or more of peer queues, associated with a plurality peer network devices, is not satisfied; compute a first update message based on information regarding one or more routes associated with the policy information; write the first update message to the peer queues based on determining that the upper utilization threshold is not satisfied; determine that the upper utilization threshold for one or more of the peer queues is satisfied; pause writing update messages to the peer queues based on determining that the upper utilization threshold is satisfied; determine, after pausing the writing of the update messages, that a lower utilization threshold for the one or more of the peer queues is satisfied; compute a second update message based on the information regarding the one or more routes; and write the second update message to the peer queues based on determining that the lower utilization threshold is satisfied.

In some implementations, a non-transitory computer-readable medium storing instructions includes one or more instructions that, when executed by one or more processors of a network device, cause the one or more processors to: receive policy information for a protocol, wherein the network device is associated with a plurality of peer network devices; compute a first update message based on information regarding one or more routes associated with the policy information; determine that an upper utilization threshold for one or more of peer queues, associated with the plurality of peer network devices, is not satisfied; write the first update message to the peer queues based on determining that the upper utilization threshold is not satisfied; compute a second update message based on the information regarding the one or more routes associated with the policy information; determine that the upper utilization threshold for one or more of the peer queues is satisfied; pause writing the second update message to the peer queues based on determining that the upper utilization threshold is satisfied; and permit the plurality of peer network devices to obtain data from corresponding ones of the peer queues in a round robin manner.

BRIEF DESCRIPTION OF THE DRAWINGS

FIGS. 5-7 are flow charts of example processes relating to regulating enqueueing and dequeuing BGP update messages.

DETAILED DESCRIPTION

Figure 1A:
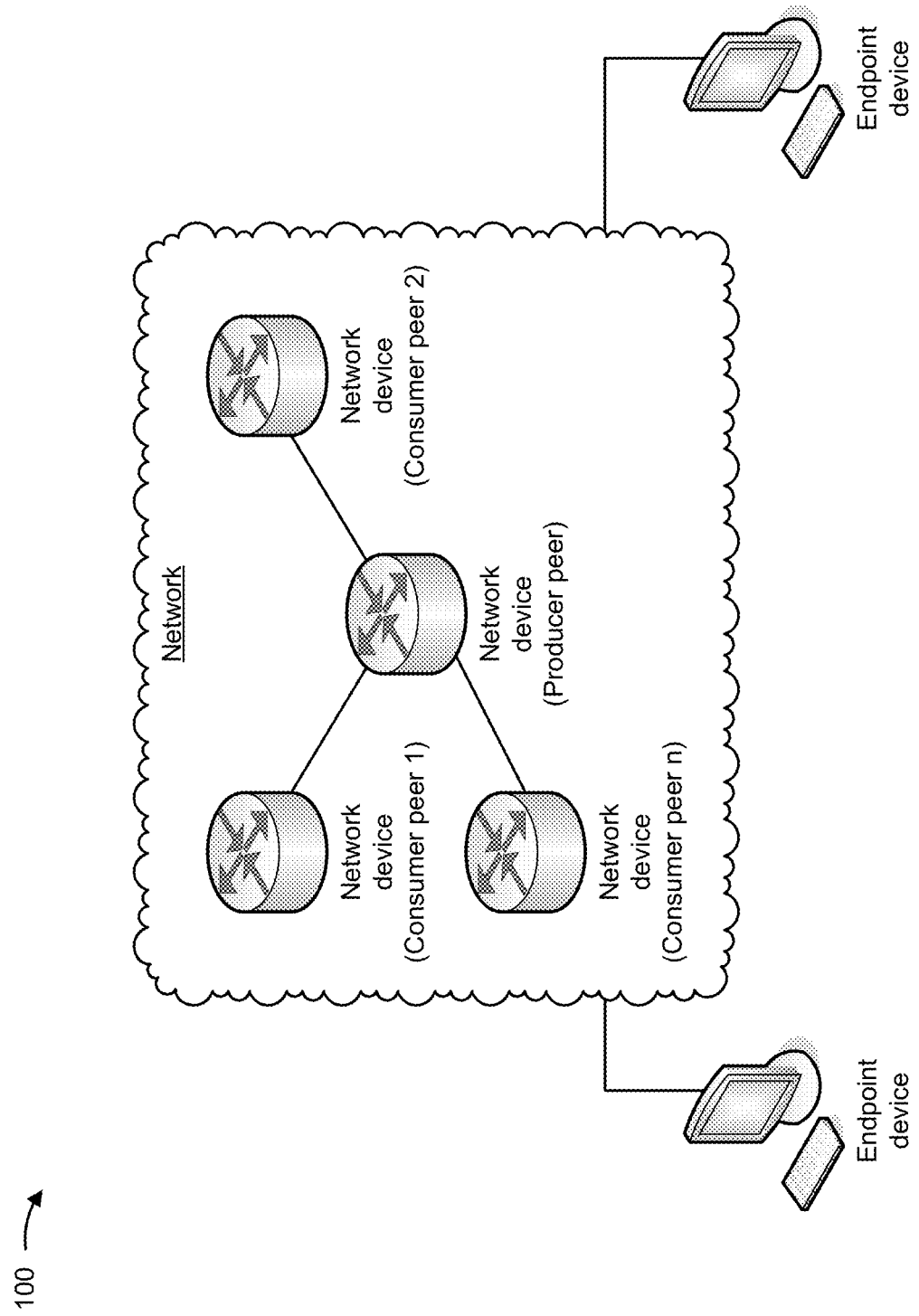
FIGS. 1A-1O are diagrams of one or more example implementations described herein.

The following detailed description of example implementations refers to the accompanying drawings. The same reference numbers in different drawings may identify the same or similar elements.

A group of routers may use BGP to exchange routing information. The routing information may include information regarding one or more routes to one or more destinations associated with a respective router of the group of routers and the routing information may be stored in a routing table of the respective router. The routers may establish Transmission Control Protocol (TCP) connections and may exchange the routing information via the TCP connections. In some instances, the group of routers may be part of a same system (e.g., a system of an entity). The routers, of the group of routers, may share an export policy. The export policy may be used to generate information regarding routes that are to be advertised. The information regarding the routes may be stored in a table and may include information identifying the routes, information identifying path attributes associated with the routes, and/or the like.

One router (sometimes referred to as a computing router) from the group of routers may generate, for the group of routers, a BGP update message based on the information regarding the routes (generated based on the export policy) and provide the BGP update message, via the TCP connections, to other routers (sometimes referred to as receiving routers) of the group of routers. The BGP update message may indicate that the route is active. Each receiving router may obtain, via a respective TCP connection of the TCP connections, the BGP update message and update the routing table based on the BGP update message. In some instances, the receiving router may modify the BGP update message (e.g., by adding a next-hop) prior to updating the routing table.

In some instances, a capacity of a first TCP socket (associated with the TCP connection of a first receiving router) to transmit data may exceed a capacity of a second TCP socket (associated with the TCP connection of a second receiving router) to transmit data. As a result, the first receiving router may obtain BGP update messages via the first TCP socket at a rate that exceeds a rate at which the second receiving router obtains BGP update messages via the second TCP socket. Accordingly, the computing router may determine that a rate at which the second receiving router obtains BGP update messages is slower than a rate at which the first receiving router obtains BGP update messages (i.e., the second receiving router is a slower receiving router relative to the first receiving router).

Based on determining that the second receiving router is a slower receiving router relative to the first receiving router, the computing router may generate, at a first time, a BGP update message based on receiving an export policy and may provide the BGP update message to the first receiving router via the first TCP socket without providing the BGP update message to the second receiving router. After the computing router receives an indication from the second receiving router that the second receiving router is able to obtain BGP update messages, the computing router may generate, at a second time, a BGP update message, based on the information regarding the routes (generated based on the export policy), and provide the BGP update message to the second receiving router via the second TCP socket. In this regard, the computing router may generate a BGP update message multiple times (or, in other words, regenerate the BGP update message) based on the export policy.

The computing router may generate the BGP update message multiple times to prevent decreasing a rate at which the first receiving router updates the routing table of the first receiving router. Decreasing the rate at which the first receiving router updates the routing table of the first receiving router negatively impacts the first receiving router by, for example, decreasing a convergence rate for the first receiving router. Generating multiple BGP update messages in such a manner unnecessarily and/or disproportionately consumes computing resources, network resources, and/or the like of the computing router.

Slow receiving routers present issues that need to be addressed such as, for example, issues relating to generating BGP update messages multiple times based on the information regarding the routes. One solution to attempt to address the issues relating to generating BGP update messages multiple times based on the information regarding the routes is for the computing router to buffer BGP update messages. For example, the computing router may write (or store) BGP update messages in queues associated with the receiving routers and the receiving routers may obtain the BGP update messages from the queues via the TCP connections (and the TCP sockets). In some instances, the computing router may write BGP update messages to the queue associated with the second receiving router at a rate that exceeds a rate at which the second receiving router obtains BGP update messages from the queue via the second TCP socket and a respective TCP connection.

As a result, over time, a size of the queue may grow at a rate that exceeds a rate at which the second receiving router obtains BGP update messages from the queue. In this regard, the size of the queue may increase and may overwhelm or exceed a storing capacity associated with the computing router. The size of the queue may be increased to accommodate BGP update messages that are outstanding for the second receiving router. Accordingly, increasing the size of the queue unnecessarily and/or disproportionately consumes memory resources of the computing router. Additionally, in some instances, a rate at which fast receiving routers obtain BGP update messages may overwhelm the ability of the computing router to fairly and/or appropriately service the fast receiving routers and the slow receiving routers. For example, multiple fast receiving routers may obtain multiple BGP update messages (e.g., all or some BGP update messages) from their respective queues prior to the second receiving router obtaining any BGP update message from the queue associated with the second receiving router.

In this regard, the computing router may determine that an amount of data (of the multiple BGP updates messages), obtained by the multiple receiving routers, has exceeded (or satisfied) a communication capacity associated with the computing router. Accordingly, the computing router may prevent the second receiving router from obtaining BGP update messages from the queue until the computing router determines that the communication capacity is no longer satisfied (or exceeded). Therefore, allowing receiving routers to obtain BGP update messages from their respective queues at different rates may overwhelm or exceed the communication capacity associated with the computing router. Accordingly, allowing receiving routers to obtain BGP update messages from the respective queues at different rates as described above unnecessarily and/or disproportionately consumes communication resources of the computing router.

Another solution to attempt to address the issues relating to generating BGP update messages multiple times is for the computing router to generate and store BGP update messages in the queues at a rate that corresponds to a rate at which the slow receiving routers obtain BGP update messages from the queues. While this solution may reduce the likelihood of the computing router regenerating a BGP update message based on an export policy, this solution reduces a convergence rate of receiving routers that are not slow receiving routers. Reducing the convergence rate of such receiving routers may increase the amount of network resources and the amount of time for routing network traffic associated with the receiving routers and/or may cause the network traffic to be routed improperly. Accordingly, reducing the convergence rate of the receiving routers unnecessarily and/or disproportionately consumes network resources associated with the receiving routers.

Yet another solution to attempt to address issues with slow receiving routers is to perform multiple attempts to transmit BGP update messages over a TCP connection before determining that a receiving router is a slow receiving router. However, performing such multiple attempts for multiple TCP connections unnecessarily and/or disproportionately consumes computing resources of the computing router. Additionally, such multiple attempts do not guarantee a successful transmission. Therefore, performing such multiple attempts consumes computing resources and network resources mitigating the unsuccessful transmissions.

According to some implementations described herein, a network device may generate update messages (e.g., BGP update messages) for a plurality of peer network devices. The network device may determine whether to write the update messages to a plurality of queues (associated with the plurality of peer network devices) based on a utilization threshold of one or more of the plurality of queues. For example, the network device may write a first update message to the plurality of queues based on determining that an upper utilization threshold associated with one or more of the plurality of queues is not satisfied and may pause writing a second update message to the plurality of queues based on determining that the upper utilization threshold is satisfied. Additionally, the network device may permit the plurality of peer network devices to obtain update messages from the plurality of queues in a uniform manner.

By writing and pausing writing the update messages to the plurality of queues based on whether the utilization threshold associated with one or more of the plurality of queues is satisfied, the network device may avoid generating and writing update messages in a manner that will cause a peer network device to appear slow. Accordingly, by writing and pausing writing the update messages to the plurality of queues based on whether the utilization threshold associated with one or more of the plurality of queues is satisfied, the network device may conserve computing resources (e.g., processing resources, memory resources, communication resources, and/or the like), network resources, and/or the like that would have otherwise been used to generate and write BGP update messages in accordance with the current techniques discussed above.

Additionally, by writing and pausing writing the update messages to the plurality of queues based on whether the utilization threshold associated with one or more of the plurality of queues is satisfied, the network device may refrain from writing update messages when the plurality of queues are full, thereby refraining from reaching a point of overwhelming or exceeding a storing capacity associated with the network device. Accordingly, by writing and pausing writing the update messages to the plurality of queues based on whether the utilization threshold associated with one or more of the plurality of queues is satisfied, the network device may conserve computing resources (e.g., processing resources, memory resources, communication resources, and/or the like) of the network device that would have otherwise been used when the size of the plurality of queues increases to the point of overwhelming or exceeding the storing capacity associated with the network device.

By permitting the plurality of peer network devices to obtain update messages from the plurality of queues in a uniform manner, the network device may maintain the capacity to fairly service the plurality of peer network devices and maintain a convergence rate of the plurality of peer network devices. Accordingly, the network device and the plurality of peer network devices may conserve computing resources (e.g., processing resources, memory resources, communication resources, and/or the like), network resources, and/or the like that would have otherwise been used to obtain BGP update messages in accordance with the current techniques discussed above.

FIGS. 1A-1O are diagrams of one or more example implementations 100 described herein. As shown in FIGS. 1A-1O, example implementation(s) 100 may include endpoint devices, network devices, and a network. The endpoint devices may include mobile devices, computers, and/or the like. The endpoint devices may be connected to the network and may provide network traffic (e.g., one or more packets) to and/or receive network traffic from the network. The network may include the network devices. The network devices may include routers, switches, gateways and/or the like. The network devices may be part of a same system (e.g., a system of an entity). In some implementations, the network devices may use BGP to exchange routing information and network reachability information.

In this regard, one of the network devices may generate BGP update messages and may sometimes be referred to as a producer. The other network devices may obtain the BGP update messages and may sometimes be referred to as consumer peers. The producer may establish connections (e.g., TCP connections) with the consumer peers and the consumer peers may obtain the BGP update message via the connections. For example, the consumer peers may connect to a respective TCP socket, of a plurality of TCP sockets of the producer, to obtain the BGP update messages. The routing information may identify one or more routes for transmitting the network traffic between the endpoint devices. One or more of the consumer peers may route the network traffic between the endpoint devices based on the routing information. In some implementations, the producer may generate and write BGP update messages to consumer peer queues using a software module (which may sometimes be referred to as a producer) and may obtain the BGP update messages from the consumer peer queues using one or more software modules (which may sometimes be referred to as consumers).

The endpoint devices, the network, and the network devices are further described below in connection with FIGS. 2, 3, and 4. The number and arrangement of the endpoint devices, the network, and the network devices shown in FIG. 1A are provided merely as examples and, in practice, example implementation(s) 100 may include a different number and arrangement of the endpoint devices, the network, and the network devices.

Figure 1B:
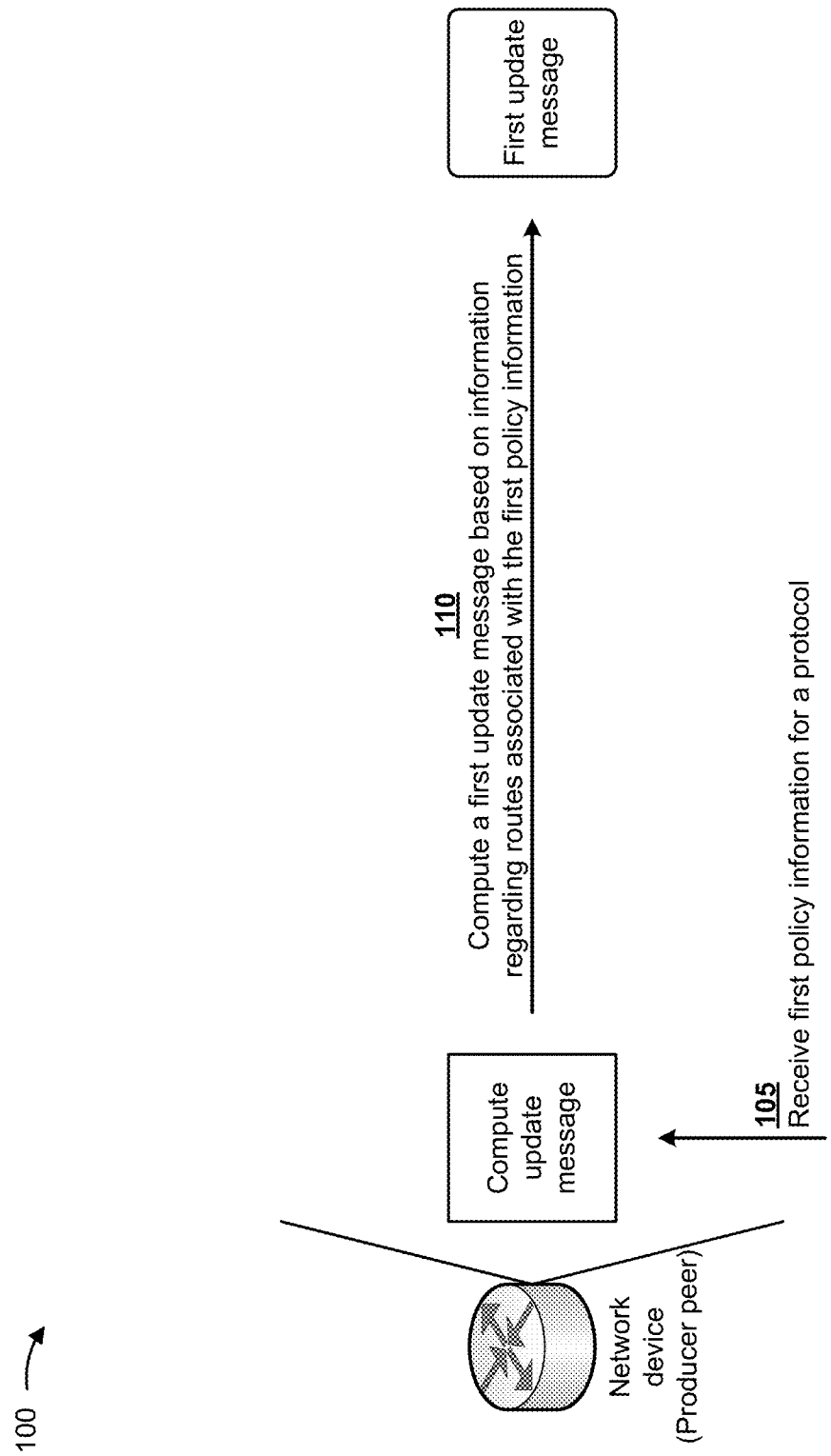

As shown in FIG. 1B, and by reference number 105, the producer peer may receive first policy information for a protocol. In some implementations, the producer peer may receive the first policy information from a network administrator (e.g., a network administrator of the entity). For example, the first policy information may be received from a client device of the network administrator. For instance, the producer peer may provide a user interface to the client device and the network administrator may submit, via the user interface and using the client device, the first policy information.

In some implementations, the first policy information may include a first export policy and the protocol may be a BGP protocol. For example, the first export policy may include information identifying the first export policy (e.g., a name, an identifier, and/or the like), information associated with advertising routes, and/or the like. The export policy may be used to generate information regarding routes that are to be advertised. The information regarding the routes may be stored in a data structure (e.g., a table) and may include information identifying the routes, information identifying path attributes associated with the routes, information identifying one or more of the other network devices that are to receive the information identifying the routes, and/or the like. As an example, the information identifying a first route (of the routes to be advertised) may include information identifying one or more next-hops (e.g., one or more network addresses), information identifying a destination associated with the first route (e.g., a network address of the destination), and/or the like. The first route may correspond to an active route.

As shown in FIG. 1B, and by reference number 110, the producer peer may compute a first update message based on the information regarding the routes associated with the first policy information. In some implementations, the first update message may include a first BGP update message that advertises the first route. In this regard, the producer peer (e.g., using the producer) may compute (or generate) the first BGP update message, for the consumer peers, based on the information regarding the routes generated based on the first export policy. The producer peer may determine, based on the information regarding the routes, that the first route is the active route for transmitting the network traffic between the endpoint devices. Accordingly, when computing the first BGP update message based on the information regarding the routes (generated based on the first export policy), the producer peer may include information that indicates, to the consumer peers, that the first route is active and is to be used to transmit the network traffic between the endpoint devices. In other words, based on the information regarding the routes identifying the first route, the producer peer may generate the first BGP update message to advertise, to the consumer peers, the first route as an active route.

The first BGP update message may include a BGP header that includes, for example, information identifying a length of the first BGP update message, information identifying a type of BGP message (e.g., an update message), and/or the like. The first BGP update message may further include information regarding a path (e.g., information identifying the first route), information regarding path attributes, and/or the like. The information regarding the path attributes may include information identifying a path origin (e.g., information identifying an originator of the path), route reflection associated with the first route, and/or the like.

The producer peer (e.g., using the producer) may write the first BGP update message to consumer peer queues (as discussed below in connection with FIG. 1D) and the consumer peers may obtain the first BGP update message from the consumer peer queues (as discussed below in connection with FIG. 1H).

Figure 1C:
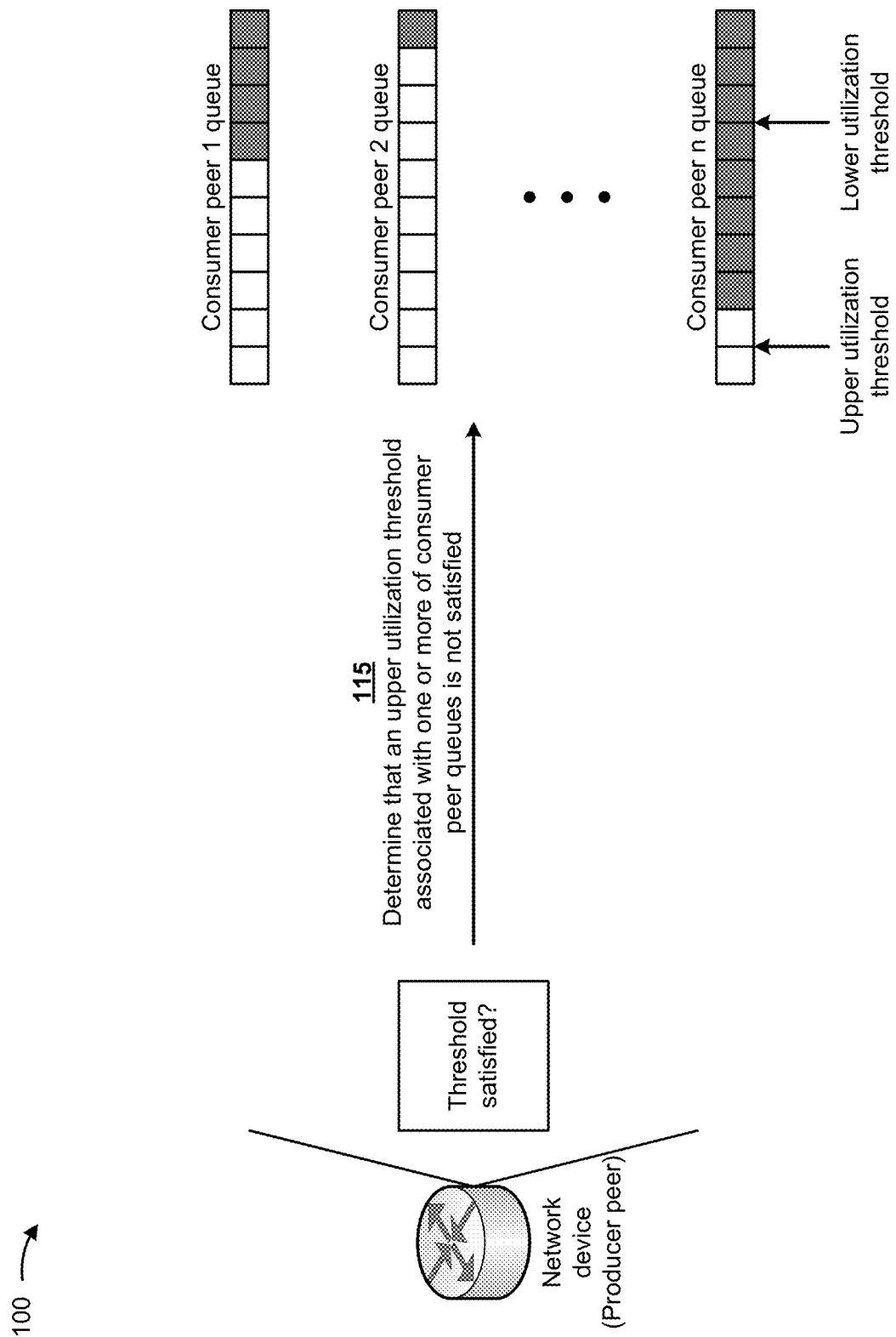

As shown in FIG. 1C, and by reference number 115, the producer peer may determine that an upper utilization threshold associated with one or more of the consumer peer queues is not satisfied. In this regard, the consumer peer queues may be stored in one or more memories associated with the producer peer and may be associated with the consumer peers. For example, a first consumer peer queue may be associated with a first consumer peer, a second consumer peer queue may be associated with a second consumer peer, and so on. In some implementations, the producer peer may determine whether to compute a BGP update message based on whether the upper utilization threshold associated with one or more of the consumer peer queues is satisfied. For example, the producer peer may compute a BGP update message based on determining that the upper utilization threshold associated with one or more of the consumer peer queues is not satisfied.

As shown in FIG. 1C, the consumer peer queues may be associated with an upper utilization threshold and a lower utilization threshold. The upper utilization threshold of a consumer peer queue may be associated with a size of the consumer peer queue or, in other words, may correspond to an upper threshold amount of BGP update messages that can be stored in the consumer peer queue. In this regard, the upper utilization threshold may be based on an upper threshold amount of data (corresponding to the upper threshold amount of BGP update messages) that is readily available to be transmitted, over a period of time, via a connection (e.g., a TCP connection) between the producer peer and a consumer peer associated with the consumer peer queue. For instance, the upper threshold amount of data may be based on a threshold amount of data that may be removed from each consumer peer queue and written to a corresponding socket (e.g., TCP socket) before overwhelming a capacity (e.g., a communication capacity) associated with the producer peer.

Alternatively, the upper utilization threshold of the consumer peer queue may be based on an upper threshold amount of data that may be transmitted and/or received by the producer peer over a period of time. The producer peer may suspend writing BGP update messages to the consumer peer queue when the upper utilization threshold of the consumer peer queue is satisfied. An example upper utilization threshold is illustrated in FIG. 1C. The lower utilization threshold may correspond to a lower threshold amount of BGP update messages (e.g., a lower threshold amount of data), stored in the consumer peer queue, that can cause the producer peer to resume writing BGP update messages to the consumer peer queues (after the producer peer has suspended writing BGP update messages due to the upper utilization threshold being satisfied).

An example lower utilization threshold is illustrated in FIG. 1C. The above amounts of BGP update messages and amounts of data are provided merely as examples of amounts of data that may be used to determine the upper utilization threshold and/or the lower utilization threshold. In practice, these and/or other amounts of BGP update messages and amounts of data may be used.

In some implementations, the upper utilization threshold and/or the lower utilization threshold may be determined by the network administrator. Additionally, or alternatively, the producer peer may determine the upper utilization threshold and/or the lower utilization threshold based on historical data regarding an amount of BGP update messages stored in consumer peer queues, historical data regarding an amount of data transmitted via the socket over a period of time, historical data regarding an amount of data transmitted and/or received by the producer peer over a period of time, and/or the like. The historical data may include historical data identifying a historical amount of BGP update messages in a consumer peer queue that causes the producer peer to suspend writing BGP update messages, a historical amount of BGP update messages in a consumer peer queue that causes the producer peer to resume writing BGP update messages, a historical amount of data transmitted via the socket prior to the socket blocking data transmission, a historical amount data transmitted and/or received by the producer peer over a period of time, and/or the like.

The consumer peer queues may be associated with a same (or substantially same) upper utilization threshold and with a same (or substantially same) lower utilization threshold. In some instances, the upper utilization threshold and the lower utilization threshold associated with one consumer peer queue may be different than the upper utilization threshold and the lower utilization threshold associated with another consumer peer queue.

The producer peer may determine an amount of BGP update messages (or an amount of data) stored in the consumer peer queues and may compare the amount of BGP update messages stored in the consumer peer queues and the upper utilization threshold. For example, the producer peer may compare the amount of BGP update messages stored in the first consumer peer queue and the upper utilization threshold (associated with the first consumer peer queue), compare the amount of BGP update messages stored in the second consumer peer queue and the upper utilization threshold (associated with the second consumer peer queue), and so on. Based on the comparisons, assume that the producer peer determines that the upper utilization threshold is not satisfied for any of the consumer peer queues (e.g., the amount of BGP update messages stored in the consumer peer queues does not meet or exceed the upper utilization threshold).

Figure 1D:
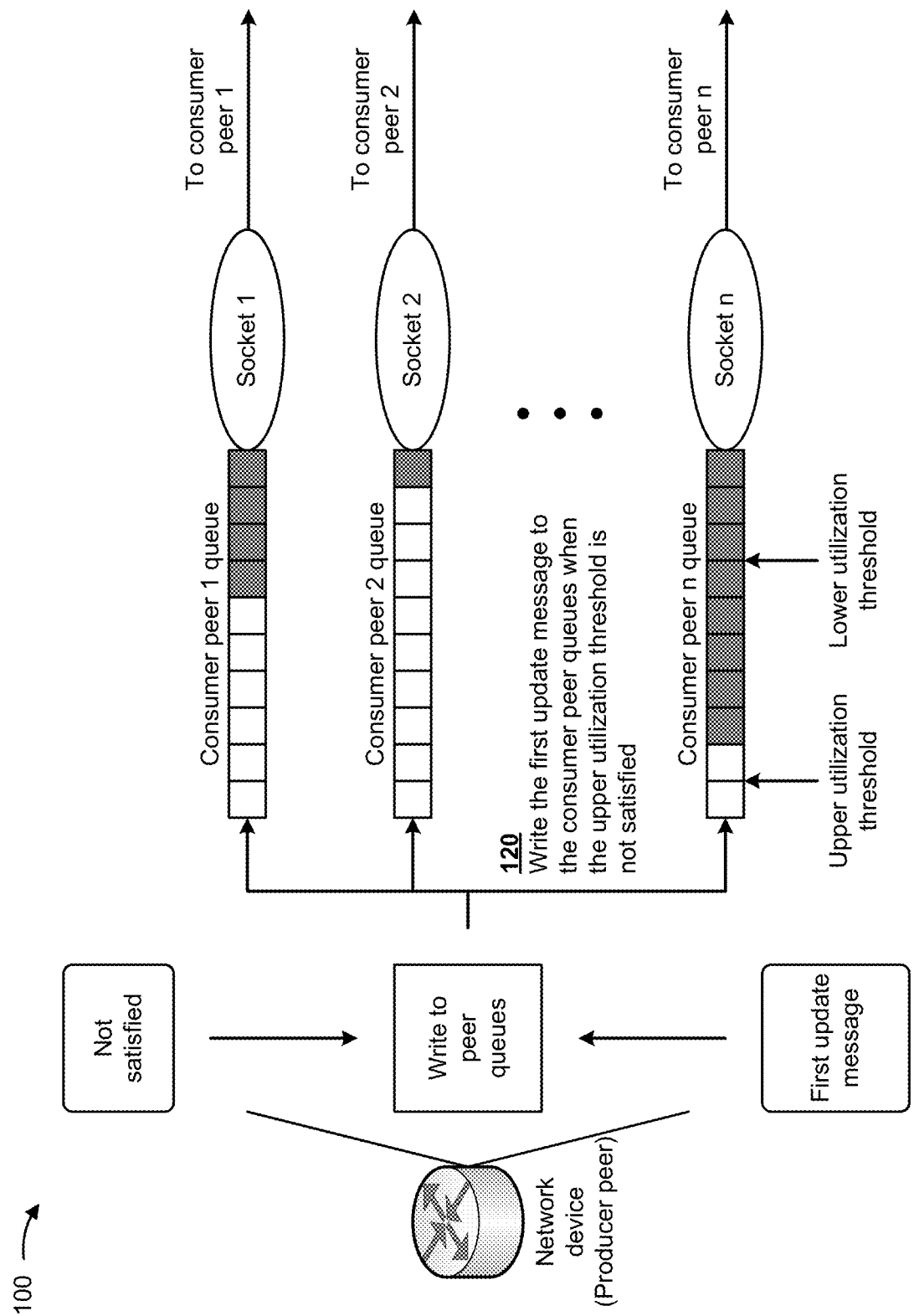

As shown in FIG. 1D, and by reference number 120, the producer peer may write the first update message to the consumer peer queues when the upper utilization threshold is not satisfied. For example, after determining that the upper utilization threshold is not satisfied for any of the consumer peer queues, the producer peer may write the first BGP update message to the consumer peer queues. For instance, the producer peer may write the first BGP update message to the first consumer peer queue, to the second consumer peer queue, and so on. In some implementations, the producer peer may write the first BGP update message to one or more of the consumer peer queues in a parallel manner. Additionally, or alternatively, the producer peer may write the first BGP update message to one or more of the consumer peer queues in a serial manner. In some implementations, the producer peer may generate the first BGP update message after determining that the upper utilization threshold is not satisfied for any of the consumer peer queues. In some implementations, the producer may write a BGP update message to a consumer peer queue without determining whether the upper utilization threshold is satisfied for the consumer peer queue, if the consumer peer queue is empty.

Figure 1E:
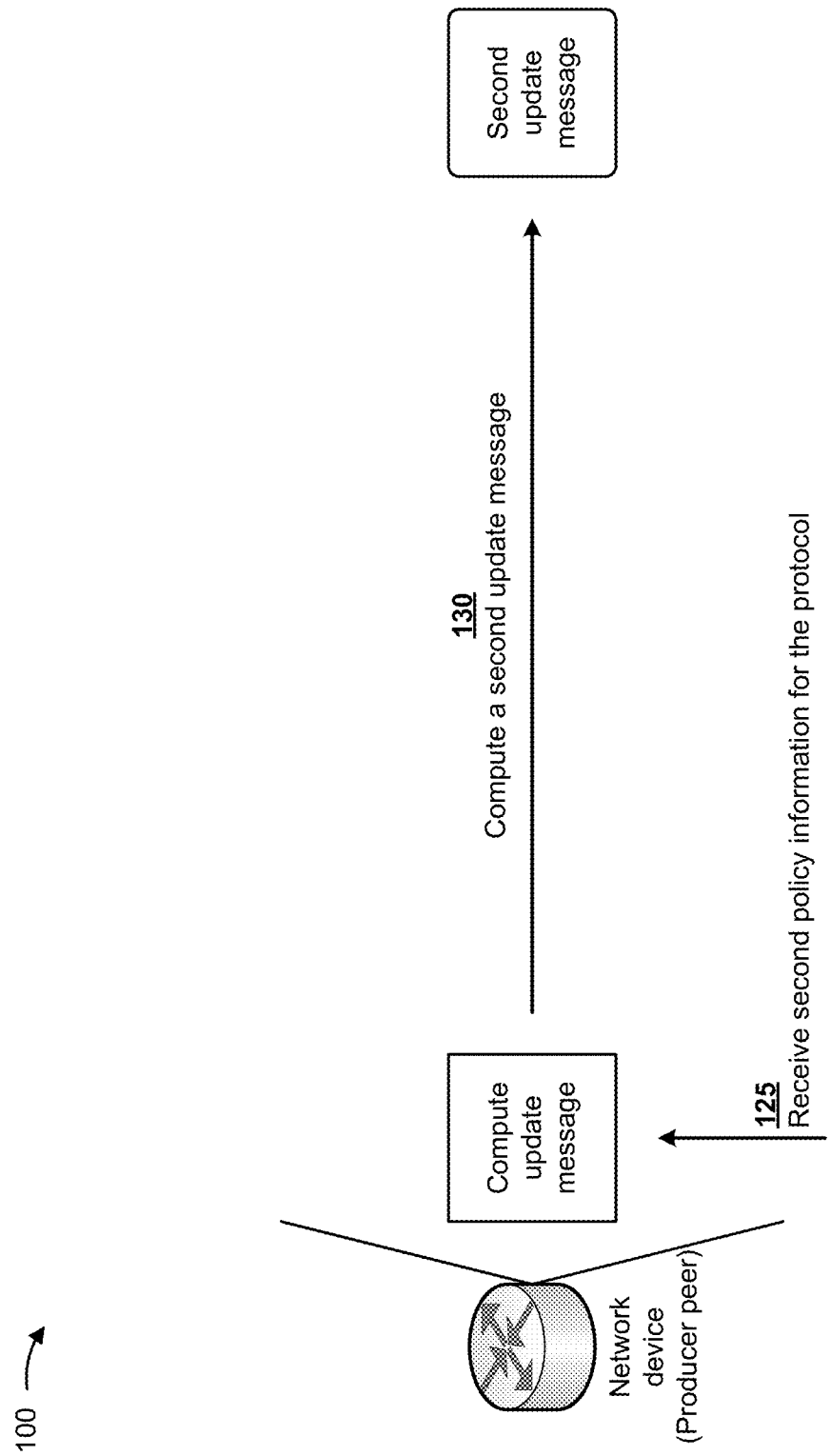

As shown in FIG. 1E, and by reference number 125, the producer peer may receive second policy information for the protocol. For example, the producer peer may receive a second export policy in a manner similar to the manner described above in connection with FIG. 1B (reference number 105). In this instance, for example, the second export policy may include information identifying the second export policy (e.g., a name, an identifier, and/or the like), information associated with advertising routes, and/or the like. The second export policy may be used to generate information regarding routes that are to be advertised, in a manner similar to the manner described above in connection with FIG. 1B (reference number 105).

As shown in FIG. 1E, and by reference number 130, the producer peer may compute a second update message. For example, the producer peer may compute (or generate) a second BGP update message based on the information regarding the routes associated with the first export policy in a manner similar to the manner described above in connection with FIG. 1B (reference number 110). In such instance, the second BGP update message may advertise a second route of the routes to be advertised. Alternatively, the producer peer may compute (or generate) the second BGP update message based on information regarding routes associated with the second export policy in a manner similar to the manner described above in connection with FIG. 1B (reference number 110).

Figure 1F:
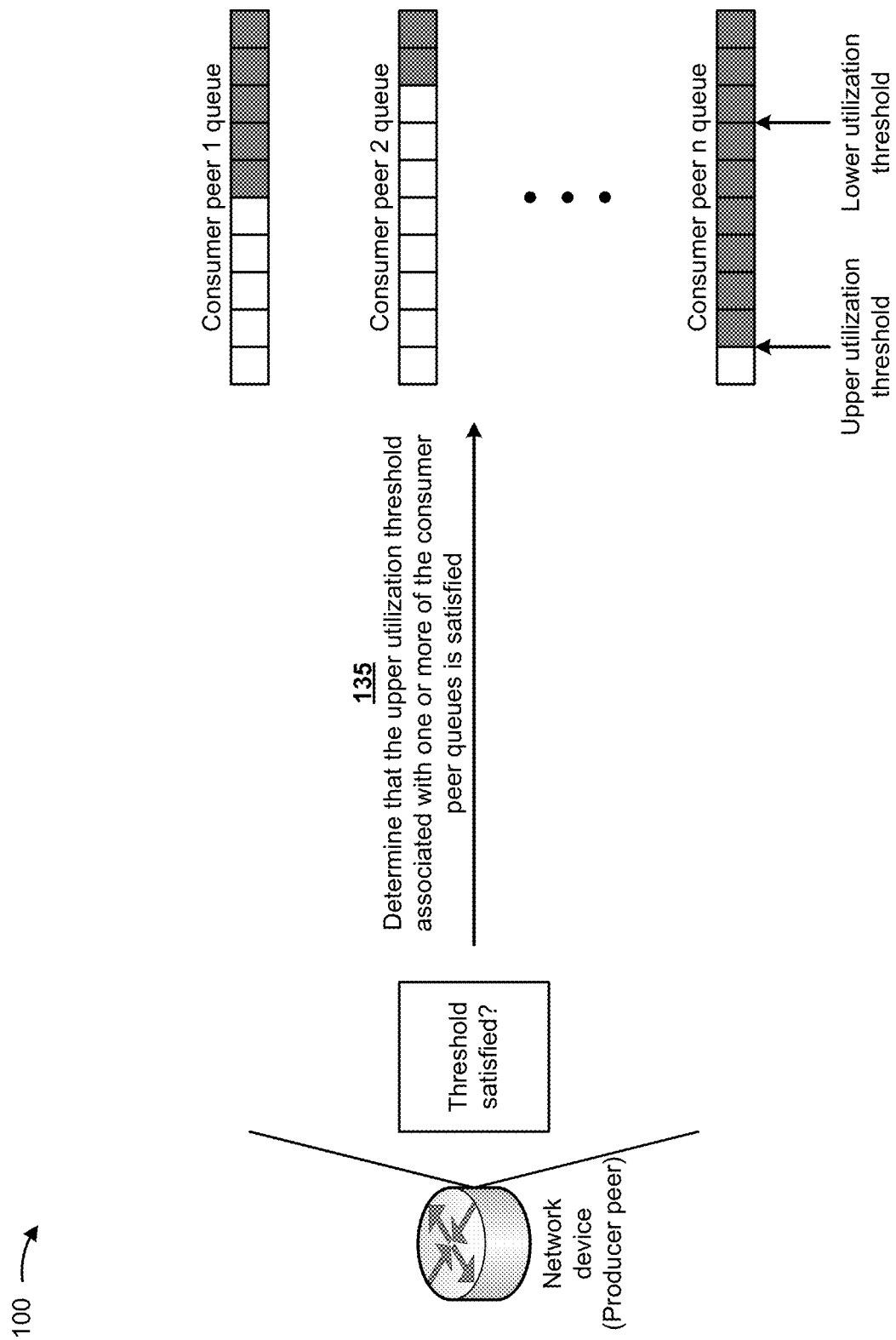

As shown in FIG. 1F, and by reference number 135, the producer peer may determine that the upper utilization threshold associated with one or more of the consumer peer queues is satisfied. For example, after writing the first BGP update message to the consumer queues and prior to writing the second BGP update message to the consumer peer queues, the producer peer may determine whether the upper utilization threshold is satisfied in a manner similar to the manner described above in connection with FIG. 1C. In some implementations, the producer peer may determine whether the upper utilization threshold is satisfied prior to computing the second BGP update message. When determining whether the upper utilization threshold is satisfied, the producer peer may determine an amount of BGP update messages stored in the consumer peer queues (or a size of the consumer peer queues) and may compare the amount of BGP update messages stored in the consumer peer queues and the upper utilization threshold (e.g., to determine whether the upper utilization threshold is satisfied, such as whether the amount of BGP update messages stored in one or more of the consumer peer queues matches or exceeds the upper utilization threshold).

For example, the producer peer may compare the amount of BGP update messages stored in the first consumer peer queue and the upper utilization threshold (associated with the first consumer peer queue), compare the amount of BGP update messages stored in the second consumer peer queue and the upper utilization threshold (associated with the second consumer peer queue), and so on. Based on the comparisons, the producer peer may determine that the upper utilization threshold is satisfied for one or more consumer peer queues of the consumer peer queues. For example, as shown in FIG. 1F, the producer peer may determine that the upper utilization threshold is satisfied for the nth consumer peer queue.

Figure 1G:
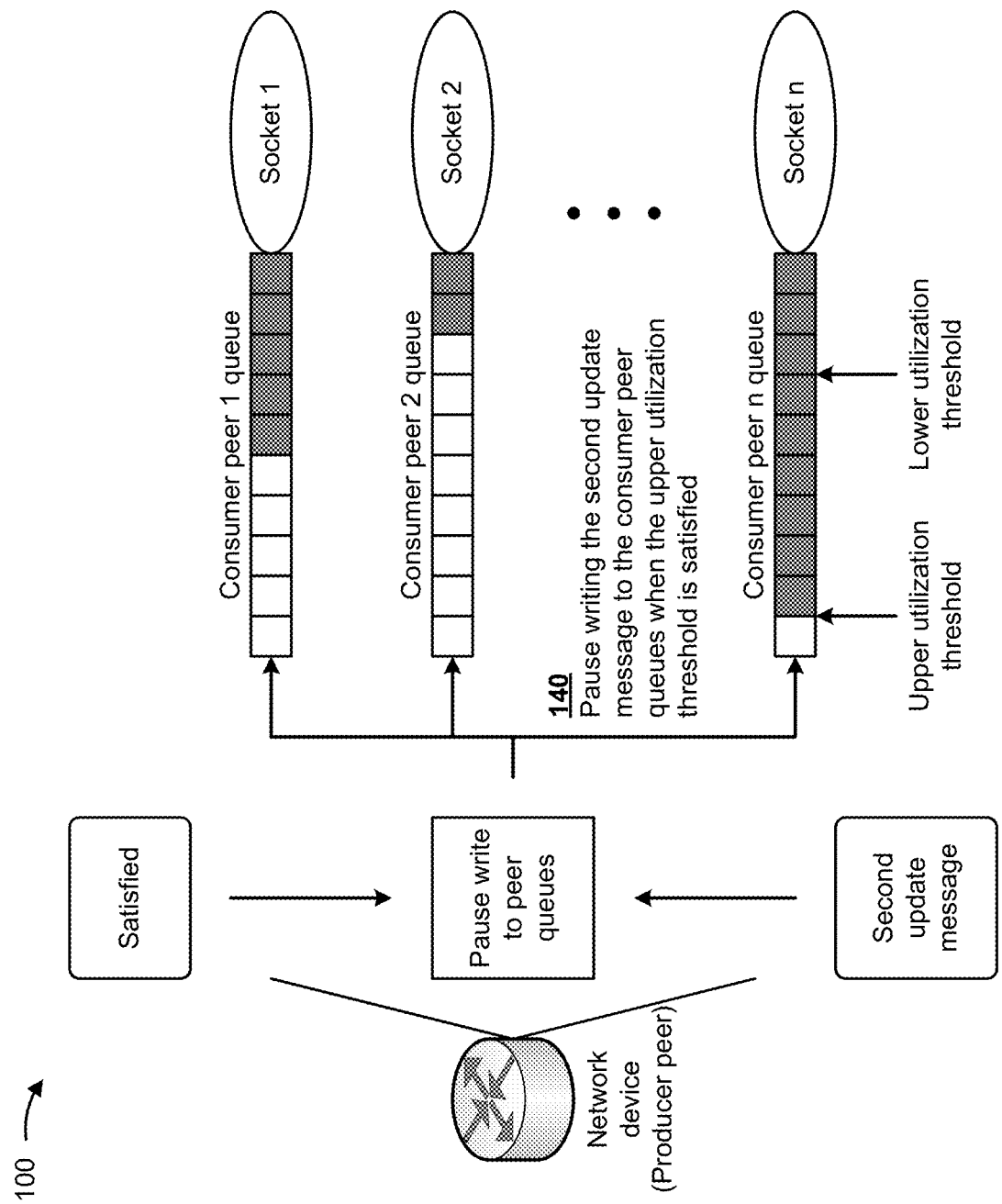

As shown in FIG. 1G, and by reference number 140, the producer peer may pause writing the second update message to the consumer peer queues when the upper utilization threshold is satisfied. For example, based on determining that the upper utilization threshold is satisfied for the one or more consumer peer queues, the producer peer may pause (or suspend) writing the second BGP update message to the consumer peer queues. As an example, the producer peer may pause writing the second BGP update message when the upper utilization threshold is satisfied for any one of the consumer peer queues. Alternatively, the producer peer may pause writing the second BGP update message when the upper utilization threshold is satisfied for multiple consumer peer queues (e.g., a threshold number of the consumer peer queues, all of the consumer peer queues, and/or the like). Alternatively, the producer peer may pause writing the second BGP update message when the producer peer determines that the upper utilization threshold is satisfied for the one or more consumer peer queues and that one or more of the consumer peers are active. For example, the producer peer may determine that a consumer peer is active when the producer peer (e.g., using a consumer) is obtaining BGP update messages from a consumer peer queue (corresponding to the consumer peer) and writing the BGP update messages to a socket (e.g., a TCP socket) (corresponding to the consumer peer).

The producer peer may pause writing the second BGP update message until the upper utilization threshold is no longer satisfied and/or the lower utilization threshold is satisfied. For example, the producer peer may pause writing the second BGP update message until the lower utilization threshold is satisfied for any one (or all) of the consumer peer queues (for which the upper utilization threshold was satisfied). Alternatively, the producer peer may pause writing the second BGP update message until the lower utilization threshold is satisfied for any one of the consumer peer queues (regardless of which of the consumer peer queues caused the upper utilization threshold to be satisfied).

Alternatively, the producer peer may pause writing the second BGP update message until the lower utilization threshold is satisfied for any one of the consumer peer queues (e.g., for any one of the consumer peer queues that caused the upper utilization threshold to be satisfied, for all of the consumer peer queues that caused the upper utilization threshold to be satisfied, any one of the consumer peer queues (regardless of which of the consumer peer queues caused the upper utilization threshold to be satisfied), and/or the like) and all of the consumer peers are inactive. The producer peer may determine that a consumer peer is inactive when the producer peer (e.g., using a consumer) is not providing BGP update messages to the consumer peer (e.g., because a corresponding consumer peer queue is empty and/or because a corresponding TCP socket is blocked).

Alternatively, the producer peer may pause writing the second BGP update message until the upper utilization threshold is no longer satisfied for the consumer peer queues (e.g., for any one of the consumer peer queues that caused the upper utilization threshold to be satisfied, for all of the consumer peer queues that caused the upper utilization threshold to be satisfied, and/or the like) and the lower utilization threshold is satisfied for the consumer peer queues (for any one of the consumer peer queues that caused the upper utilization threshold to be satisfied, for all of the consumer peer queues that caused the upper utilization threshold to be satisfied, and/or the like).

Alternatively, the producer peer may pause writing the second BGP update message until the upper utilization threshold is no longer satisfied for the consumer peer queues (e.g., for any one of the consumer peer queues that caused the upper utilization threshold to be satisfied, for all of the consumer peer queues that caused the upper utilization threshold to be satisfied, and/or the like) and the lower utilization threshold is satisfied for any one of the consumer peer queues (regardless of which of the consumer peer queues caused the upper utilization threshold to be satisfied).

Accordingly, the producer peer may permit the consumer peers to obtain data from the consumer peer queues to reduce the amount of BGP update messages in the consumer peer queues in order to satisfy the lower utilization threshold. In this regard, the producer peer may permit the consumer peers to obtain BGP update messages from the consumer peer queues in a uniform manner to maintain synchronization between the consumer peers (e.g., to fairly and/or appropriately service the consumer peers, maintain synchronization with respect to using a current active route, updating routing tables, and/or the like). For example, the producer peer may permit the consumer peers to obtain BGP update messages from the consumer peer queues in a round robin manner, as discussed below in connection with FIG. 1H. For instance, the producer peer may permit the consumer peers to obtain a particular number of BGP update messages (e.g., one or more BGP update messages) from the consumer peer queues in a round robin fashion.

Additionally, or alternatively, the producer peer may permit the consumer peers to obtain BGP update messages based on a ranking of the consumer peer queues and/or the consumer peers. For example, the ranking may be based on a quantity of BGP update messages stored in the consumer peer queues (e.g., a consumer peer queue with a higher quantity of BGP update messages being ranked higher than a consumer peer queue with a lower quantity of BGP update messages), based on a rate of the consumer peers obtaining BGP update messages (e.g., a consumer peer that obtains BGP update messages at a higher rate being ranked higher than a consumer peer that obtains BGP update messages at a lower rate), a recency of the consumer peers obtaining BGP update messages (e.g., a consumer peer that more recently obtained a BGP update message being ranked lower than a consumer peer that less recently obtained a BGP update message), and/or the like. A consumer peer may obtain BGP update messages from a corresponding consumer peer queue in a first in first out manner.

In some implementations, the particular number of BGP update messages provided to a consumer peer queue at a given time may be determined by the network administrator. Alternatively, the particular number of BGP update messages may be determined by the producer peer based on historical data (e.g., historical data identifying an amount of data included in BGP update messages, historical data identifying data transmitted and/or received by the producer peer over a period of time, and/or the like). The particular number of BGP update messages may be based on a number of BGP update messages (or an amount of data) that may be obtained by all the consumer peers without reaching a capacity of data transmitted and/or received by the producer peer over a period of time. The above number of BGP update messages and manners for obtaining BGP update messages are provided merely as examples of a number of BGP update messages and manners for obtaining BGP update messages from a consumer peer queue. In practice, these and other numbers of BGP update messages may be used with respect to obtaining data from the consumer peer queues.

Figure 1H:
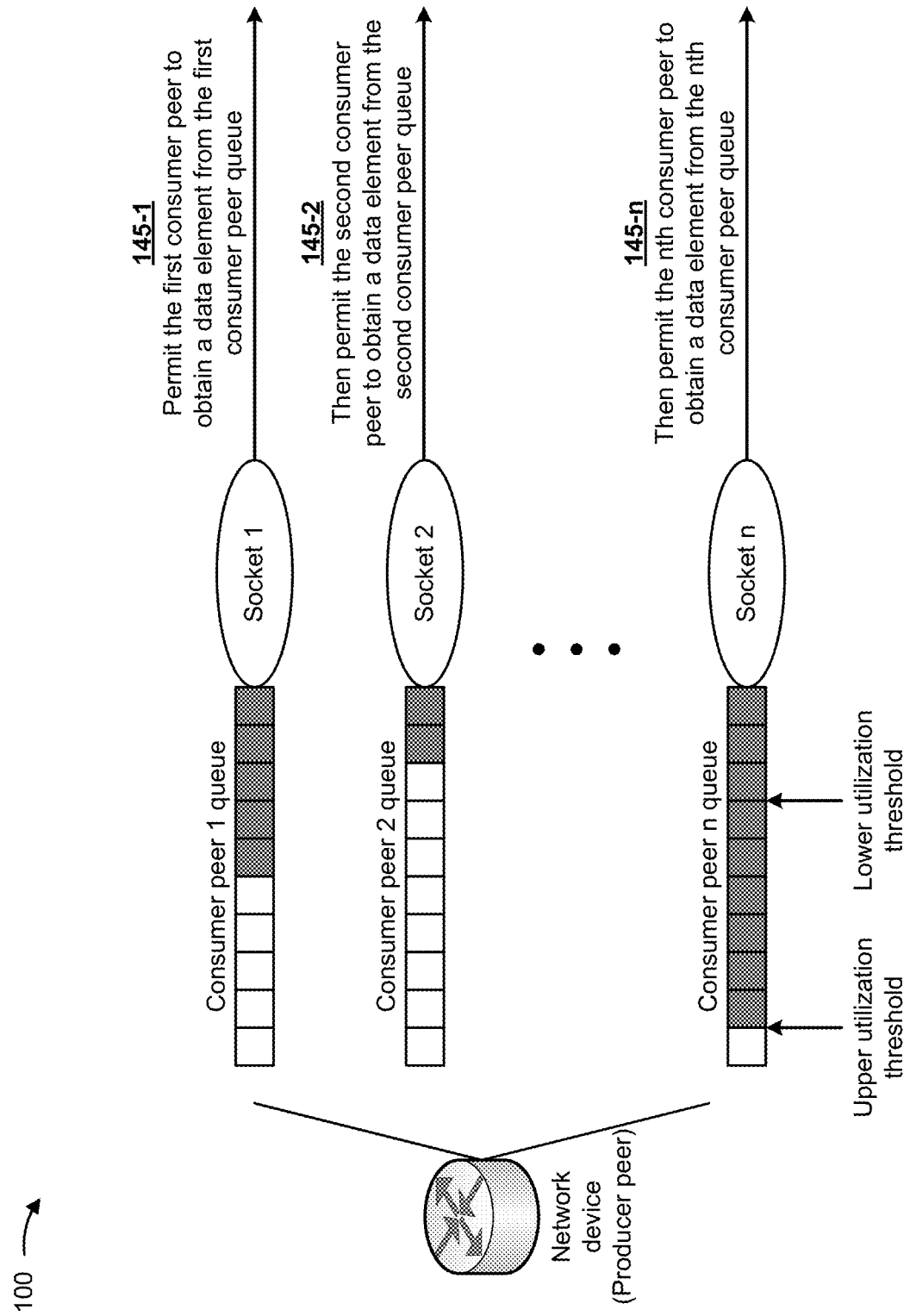

As shown in FIG. 1H, and by reference number 145-1, the producer peer may permit the first consumer peer to obtain a data element from the first consumer peer queue. The data element may correspond to the particular number of BGP update messages. In some implementations, the first consumer peer may use a first connection (e.g., a first TCP connection) to obtain the data element. For example, the producer peer (e.g., using a first consumer) may remove the data element from the first consumer peer queue and write the data element to a first corresponding socket (e.g., a first corresponding TCP socket). The first consumer peer may obtain the data element from the first corresponding socket. In this regard, the producer peer may provide the data element from the first consumer peer queue to the first consumer peer via the first connection and the first corresponding socket (e.g., the first corresponding TCP socket).

As shown in FIG. 1H, and by reference number 145-2, the producer peer may permit the second consumer peer to obtain a data element from the second consumer peer queue. For example, the producer peer may provide a data element (e.g., the particular number of BGP update messages) from the second consumer peer queue to the second consumer peer in a manner similar to the manner discussed in connection with FIG. 1F (reference number 145-1). The data element may be provided to the second consumer peer before, during, or after providing the data element to the first consumer peer.

As shown in FIG. 1H, and by reference number 145-n, the producer peer may permit the nth consumer peer to obtain a data element from the nth consumer peer queue. For example, the producer peer may provide a data element (e.g., the particular number of BGP update messages) from the nth consumer peer queue to the nth consumer peer in a manner similar to the manner discussed in connection with FIG. 1F (reference number 145-1). The data element may be provided to the nth consumer peer before, during, or after providing the data element to the first consumer peer and/or to the second consumer peer.

In some implementations, the producer peer may provide the data elements to a plurality of the consumer peers in a parallel manner. Additionally, or alternatively, the producer peer may provide the data elements to the plurality of the consumer peer queues in a serial manner.

The above number of BGP update messages and manners for obtaining BGP update messages are provided merely as examples of a number of BGP update messages and manners for obtaining BGP update messages from a consumer peer queue. In practice, these and other numbers of BGP update messages may be used with respect to obtaining BGP update messages from the consumer peer queues. For example, the order in which the consumer peer queues are processed, the manner in which the consumer peer queues are processed, and/or the number of BGP update messages provided at a given time may different than what is described above. Additionally, or alternatively, the number of BGP update messages provided at a given time for one consumer peer queue may be different from the number of BGP update messages provided at a given time for another consumer peer queue.

After providing the data element to one or more of the consumer peers, the producer peer may determine whether the lower utilization threshold, associated with the consumer peer queues, is satisfied in a manner similar to the manner discussed in connection with FIG. 1C. For example, the producer peer may determine an amount of BGP update messages stored in the consumer peer queues (or a size of the consumer peer queues) and may compare the amount of BGP update messages stored in the consumer peer queues and the lower utilization threshold. Based on the comparisons, the producer peer may determine whether the lower utilization threshold is satisfied for one or more consumer peer queues (for any one of the consumer peer queues that caused the upper utilization threshold to be satisfied, for all of the consumer peer queues that caused the upper utilization threshold to be satisfied, for any of the consumer peer queues regardless of which of the consumer peer queues caused the upper utilization threshold to be satisfied, for all of the consumer peer queues, and/or the like).

The producer peer (e.g., using a consumer) may remove data elements from a consumer peer queue until the consumer peer queue is empty or until a corresponding socket (e.g., TCP socket) is blocked. If the producer peer determines that the lower utilization threshold is satisfied for the one or more consumer peer queues, the producer peer may resume generating and/or writing BGP updates messages. On the other hand, if the producer peer determines that the lower utilization threshold is not satisfied for the one or more consumer peer queues (e.g., because data elements are not removed from the one or more consumer peer queues due to the corresponding sockets being blocked), the producer peer may provide an additional data element to the consumer peers (e.g., when the corresponding sockets are no longer blocked) in a manner similar to the manner described above in connection with FIG. 1H. For example, the producer peer (e.g., using consumers) may remove data elements from the consumer peer queues and write the data elements to the corresponding sockets (e.g., corresponding TCP sockets), in a manner similar to the manner described above in connection with FIG. 1H, until the producer peer determines that the lower utilization threshold is satisfied for one or more of the consumer peer queues and that the consumer peers are inactive.

Figure 1I:
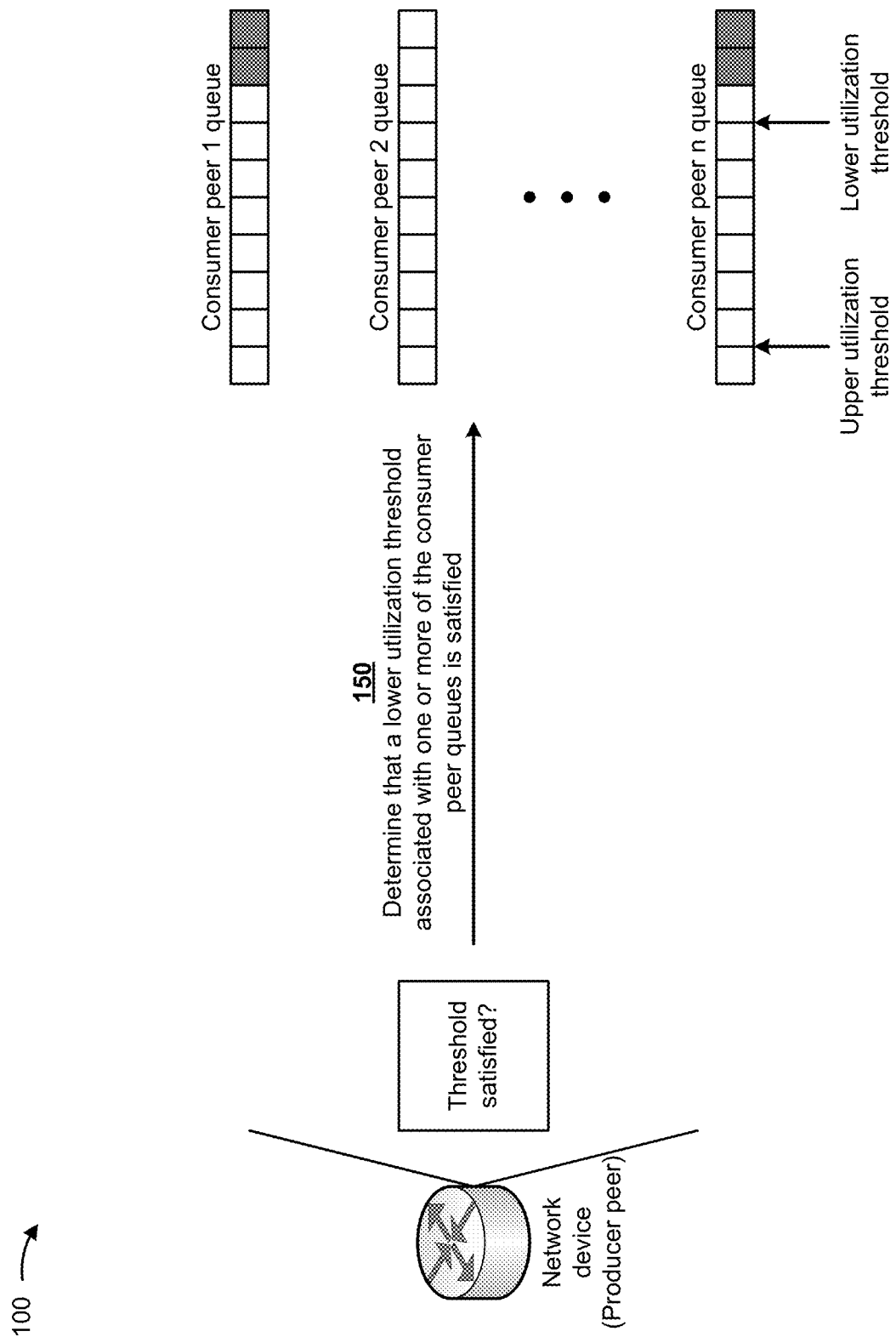

As shown in FIG. 1I, and by reference number 150, the producer peer may determine that a lower utilization threshold associated with one or more of the consumer peer queues is satisfied. For example, after providing one or more data elements to one or more of the consumer peer queues, the producer peer may compare the number of BGP update messages stored in the consumer peer queues and the lower utilization threshold. Based on the comparisons, the producer peer may determine that the lower utilization threshold is satisfied for one or more consumer peer queues of the consumer peer queues. For example, as shown in FIG. 1I, the producer peer may determine that the lower utilization threshold is satisfied for the first consumer peer, the second consumer peer, and the nth consumer peer.

Figure 1J:
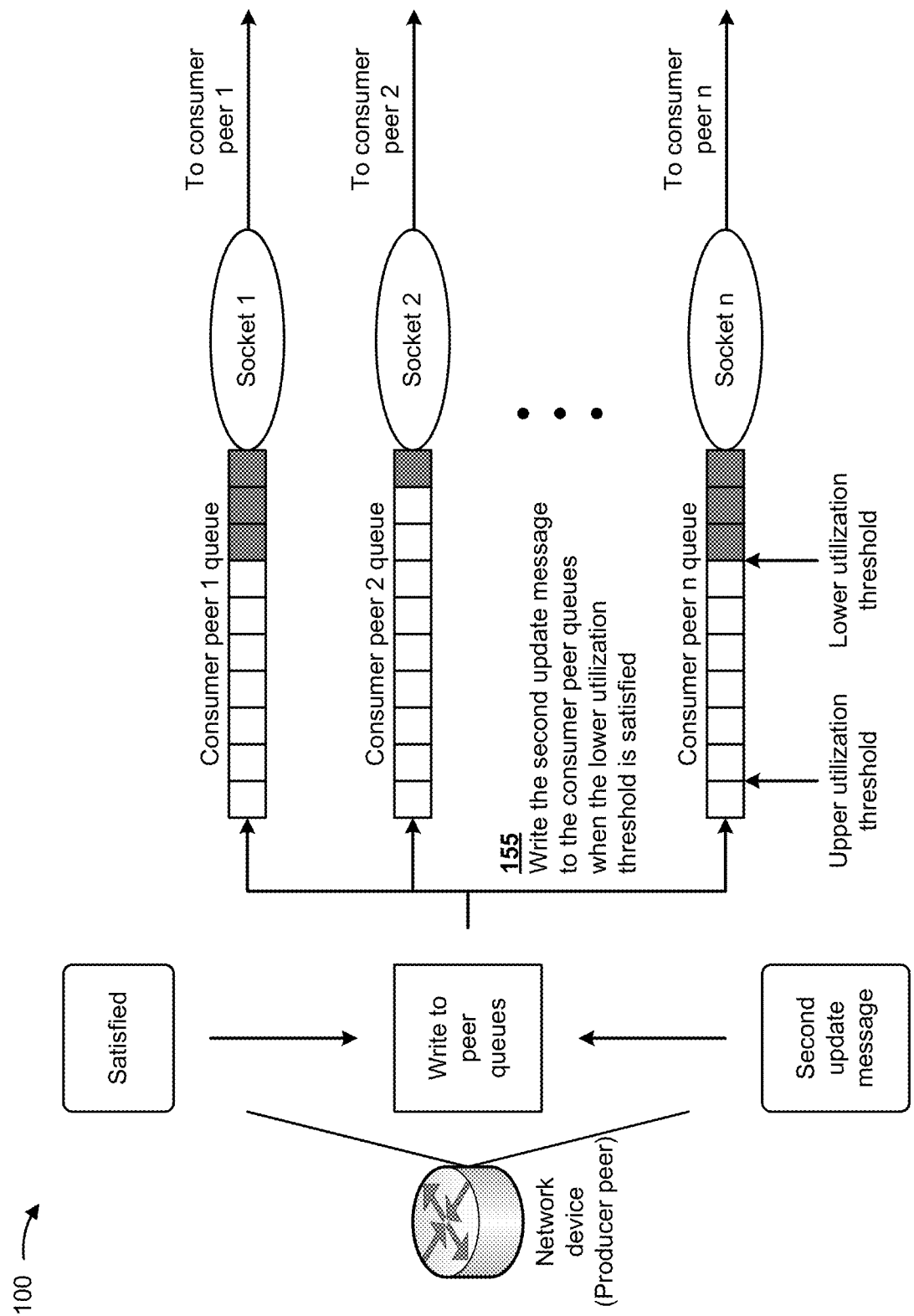

As shown in FIG. 1J, and by reference number 155, the producer peer may write the second update message to the consumer peer queues when the lower utilization threshold is satisfied. For example, based on determining that the lower utilization threshold is satisfied for one or more consumer peer queues, the producer peer may resume writing BGP update messages to the consumer peer queues in a manner similar to the manner discussed above in connection with FIG. 1D. In this instance, for example, the producer peer may write the second BGP update message to the consumer peer queues. By resuming writing BGP update messages to the consumer peer queues when the lower utilization threshold is satisfied for the one or more consumer peer queues, the producer peer may refrain from writing update messages when the consumer peer queues are full (or satisfy the upper utilization threshold), thereby refraining from reaching a point of overwhelming or exceeding a storing capacity associated with the producer peer.

Figure 1K:
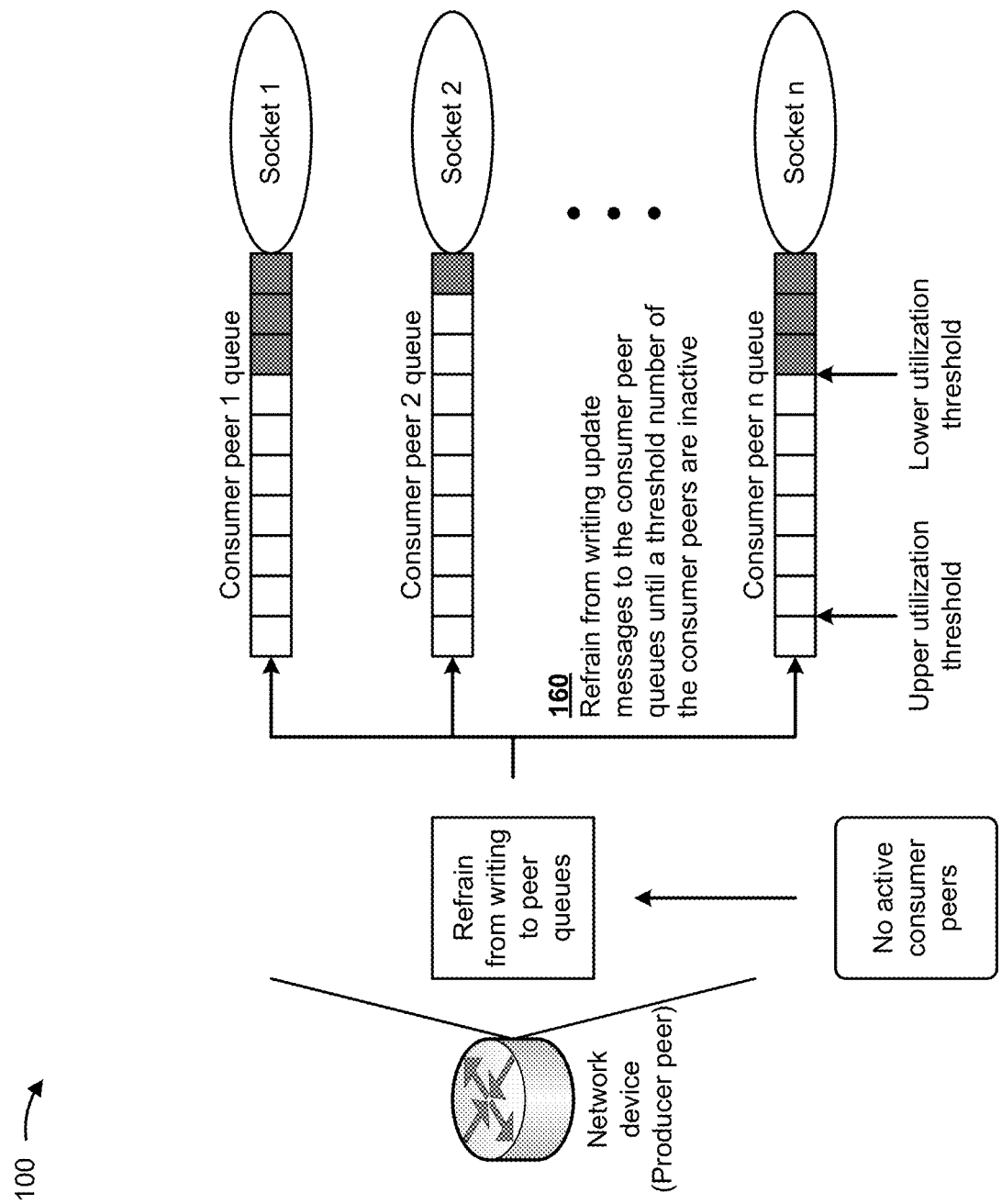

As shown in FIG. 1K, and by reference number 160, the producer peer may refrain from writing update messages to the consumer peer queues until a threshold number of the consumer peers are inactive. As explained above, the producer peer may determine that the consumer peers are inactive when the producer peer (e.g., using the consumers) is no longer removing BGP update messages from the consumer peer queues and writing the BGP update message to the corresponding sockets (e.g., because the consumer peer queues are empty and/or because the corresponding sockets (e.g., TCP sockets) are blocked). For example, the threshold number of the consumer peers may include one or more of the consumer peers, a proper subset of the consumer peers, all of the consumer peers, and/or the like.

In some implementations, the producer peer may periodically determine whether the consumer peers are active (as explained). For example, the producer peer may determine whether the consumer peers are active before and/or after writing one or more BGP update messages to the consumer peer queues. In this regard, after writing the second BGP update message to the consumer peer queues, the producer peer may determine whether the consumer peers are active. For example, the producer peer may determine whether the consumers are removing BGP update messages from the consumer peer queues and are writing the BGP update messages to corresponding sockets (e.g., TCP sockets).

If any of the consumer peers are active, the producer peer may refrain from writing a BGP update message to the consumer peer queues. In this regard, the producer peer may pause (or suspend) writing BGP update messages to the consumer peer queues until the producer peer determines that the consumers are inactive (as explained above). After a period of time following pausing (or suspension) of writing BGP update messages, the producer peer may determine whether the consumers are inactive. If the producer peer determines that all of the consumers are inactive and that one or more of the consumer peer queues satisfy the low utilization threshold, the producer peer may resume writing BGP update messages to the consumer peer queues in a manner similar to the manner described above.

Figure 1L:
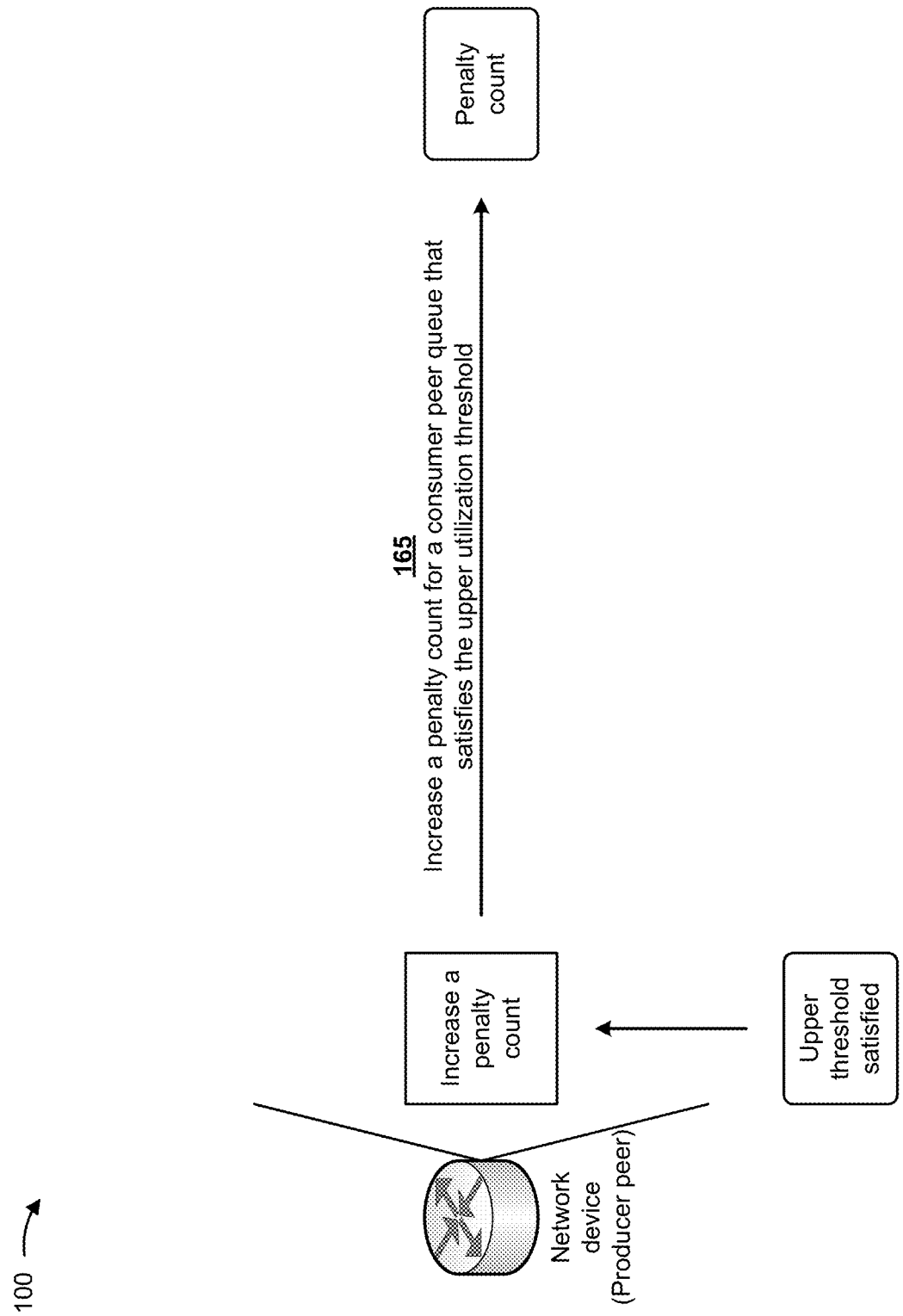

As shown in FIG. 1L, and by reference number 165, the producer peer may increase a penalty count for a consumer peer queue that satisfies the upper utilization threshold. In this regard, the producer peer may identify the consumer peer queue as a slow consumer peer queue and, accordingly, prevent the slow consumer peer queue from causing the producer peer to pause (or suspend) writing BGP update messages to other consumer peer queues each time the slow consumer peer queue satisfies the upper threshold utilization rate. By preventing the slow consumer peer queue from causing the producer peer to pause (or suspend) writing BGP update messages to other consumer peer queues, the producer peer may continue to write BGP update messages to the other consumer peer queues, thereby maintaining a rate of convergence of the consumer peers associated with the other consumer peer queues and improving an operating efficiency of the network.

In this regard, in order to identify the slow consumer peer queue, the producer peer may determine whether any consumer peer queue satisfies the upper utilization threshold (associated with the consumer peer queue) in a similar to the manner described above in connection with FIG. 1F. The producer peer may increase a penalty count for the consumer peer queue that satisfies the upper utilization threshold. For example, the producer peer may increase the penalty count, for the consumer peer queue, by a value of one (1) or by some other value that indicates that the consumer peer queue has satisfied the upper utilization threshold.

Figure 1M:
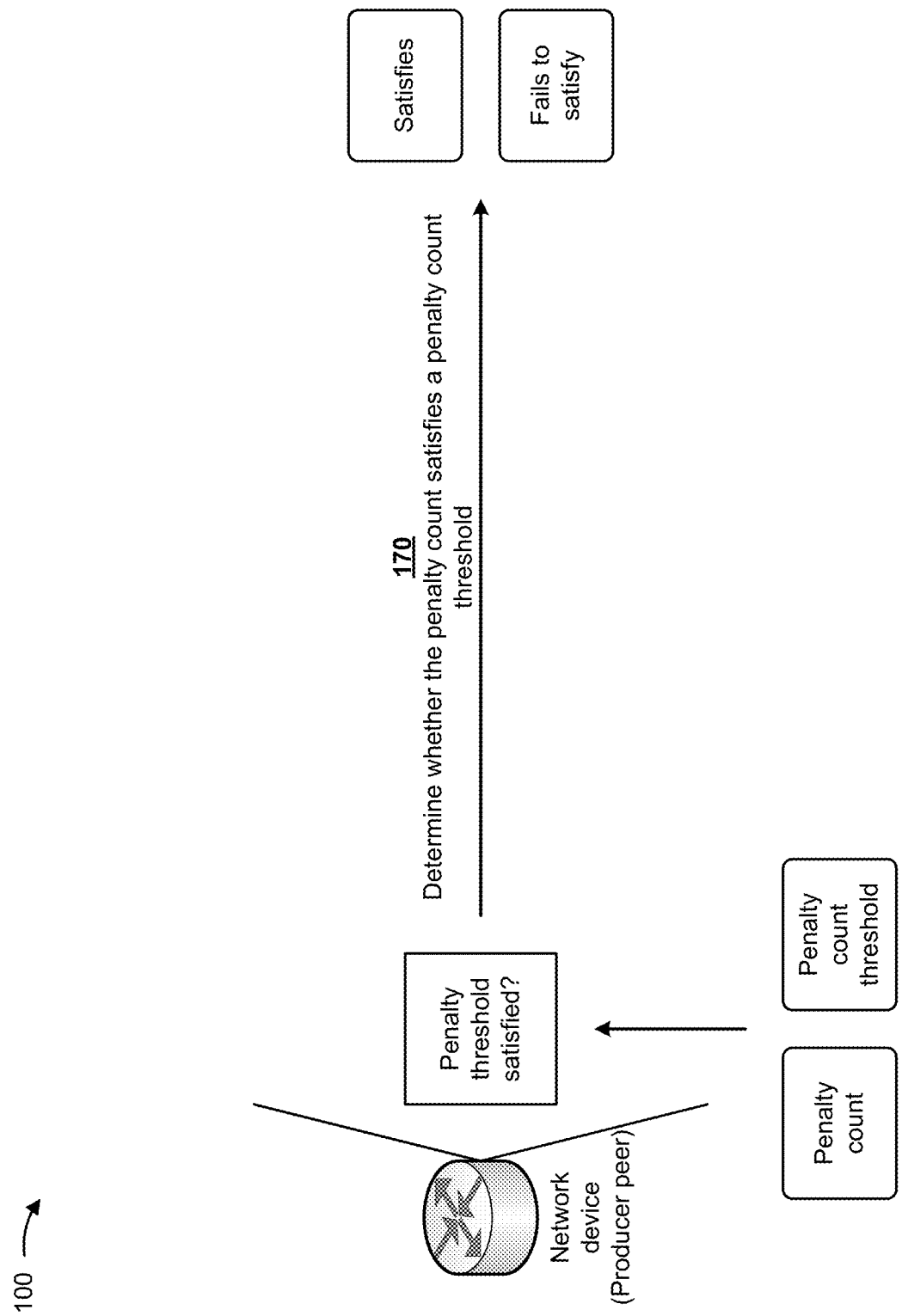

As shown in FIG. 1M, and by reference number 170, the producer peer may determine whether the penalty count satisfies a penalty count threshold. In some implementations, the penalty count threshold may be determined by the network administrator. Alternatively, the producer peer may determine the penalty count threshold based on historical data such as, for example, historical data identifying a quantity of times slow consumer peer queues have satisfied the upper utilization threshold over a period of time. In this regard, after increasing the penalty count, the producer peer may determine whether the penalty count satisfies the penalty count threshold. In some implementations, the penalty count threshold may be less than a size of the consumer peer queue.

Figure 1N:
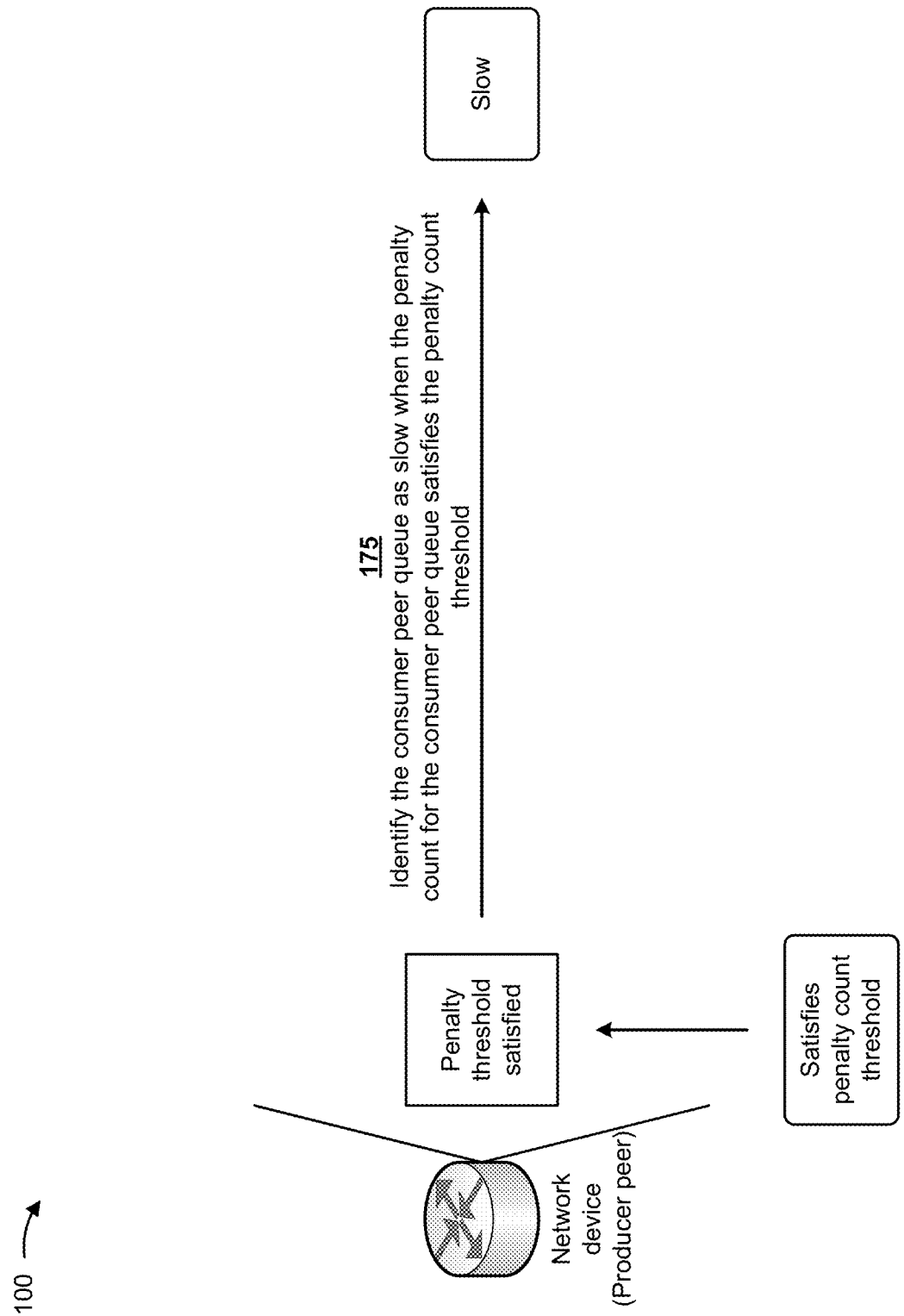
Figure 10:
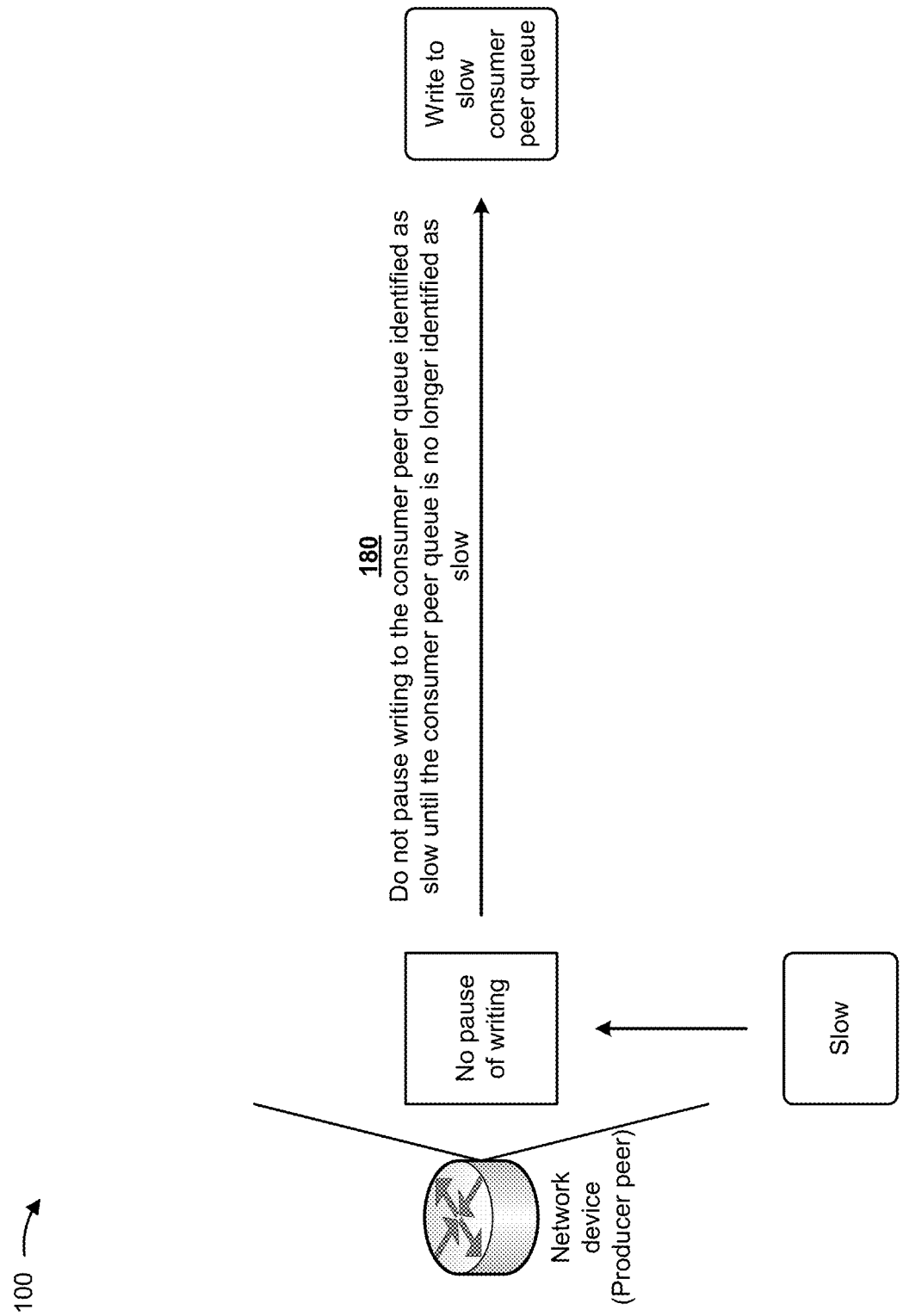

As shown in FIG. 1N, and by reference number 175, the producer peer may identify the consumer peer queue as slow when the penalty count for the consumer peer queue satisfies the penalty count threshold. For example, the producer peer may identify the slow consumer peer queue to prevent the slow consumer peer queue from causing the producer peer to pause (or suspend) writing BGP update messages to other consumer peer queues each time the slow consumer peer queue satisfies the upper utilization threshold. In some instances, the slow consumer peer queue may be associated with a connection that is blocking transmission of data and, accordingly, pausing writing BGP update messages to the slow consumer peer queue may not resolve the issue with the connection. Therefore, the producer peer may continue to write BGP update message to the consumer peer queues (including the slow consumer peer queue) regardless of whether the slow consumer peer queue satisfies the upper utilization threshold. In this regard, the producer peer may pause (or suspend) writing BGP update messages to the slow consumer peer queue when the producer peer determines that the slow consumer peer queue satisfies the upper utilization threshold and may resume writing BGP update messages when the producer peer determines that the slow consumer peer queue satisfies the lower utilization threshold.

As shown in FIG. 1O, and by reference number 180, the producer peer may not pause writing to the consumer peer queue identified as slow until the consumer peer queue is no longer identified as slow. For example, the producer peer may not pause writing to the consumer peer queue identified as slow until the producer peer writes, to the consumer peer queue, a BGP update message advertising a current route (accordingly, the consumer peer queue may no longer be identified as slow). For instance, assume that when the producer peer pauses writing BGP update message to the slow consumer peer queue, the producer peer has written (to all the consumer peer queues) a BGP update message that advertises a tenth route of the routes to be advertised. Further assume that the producer peer continues to write BGP update messages to consumer peer queues that are not identified as slow consumer peer queues and writes a BGP update message that advertises a fifteenth route of the routes to be advertised (the fifteenth route being a current route).

Further assume that the producer peer determines that the slow consumer peer queue satisfies the lower utilization threshold and resume writing BGP update messages to the slow consumer peer queue. For example, when the connection issue has been resolved, BGP update messages may be obtained from the slow consumer peer queue and provided to the consumer peer, thereby reducing the amount of BGP update messages in the slow consumer peer queue and causing the slow consumer peer queue to satisfy the lower utilization threshold. The producer peer may determine that the slow consumer peer queue is no longer slow when the producer peer writes, to the slow consumer peer queue, a BGP update message advertising the fifteenth route (e.g., the current route).

Causing the slow consumer queue to satisfy the lower utilization threshold may prevent the slow consumer peer queue from causing the producer peer to pause (or suspend) writing BGP update messages to other consumer peer queues, thereby maintaining a rate of convergence of the faster consumer peers associated with the other consumer peer queues and improving an operating efficiency of the network.

As indicated above, FIGS. 1A-1O are provided merely as one or more examples. Other examples may differ from what is described with regard to FIGS. 1A-1O. The number and arrangement of devices and/or networks shown in FIGS. 1A-1O are provided as one or more examples. In practice, there may be additional devices and/or networks, fewer devices and/or networks, different devices and/or networks, or differently arranged devices and/or networks than those shown in FIGS. 1A-1O. Furthermore, two or more devices shown in FIGS. 1A-1O may be implemented within a single device, or a single device shown in FIGS. 1A-1O may be implemented as multiple, distributed devices. Additionally, or alternatively, a set of devices (e.g., one or more devices) of FIGS. 1A-1O may perform one or more functions described as being performed by another set of devices of FIGS. 1A-1O.

Figure 2:
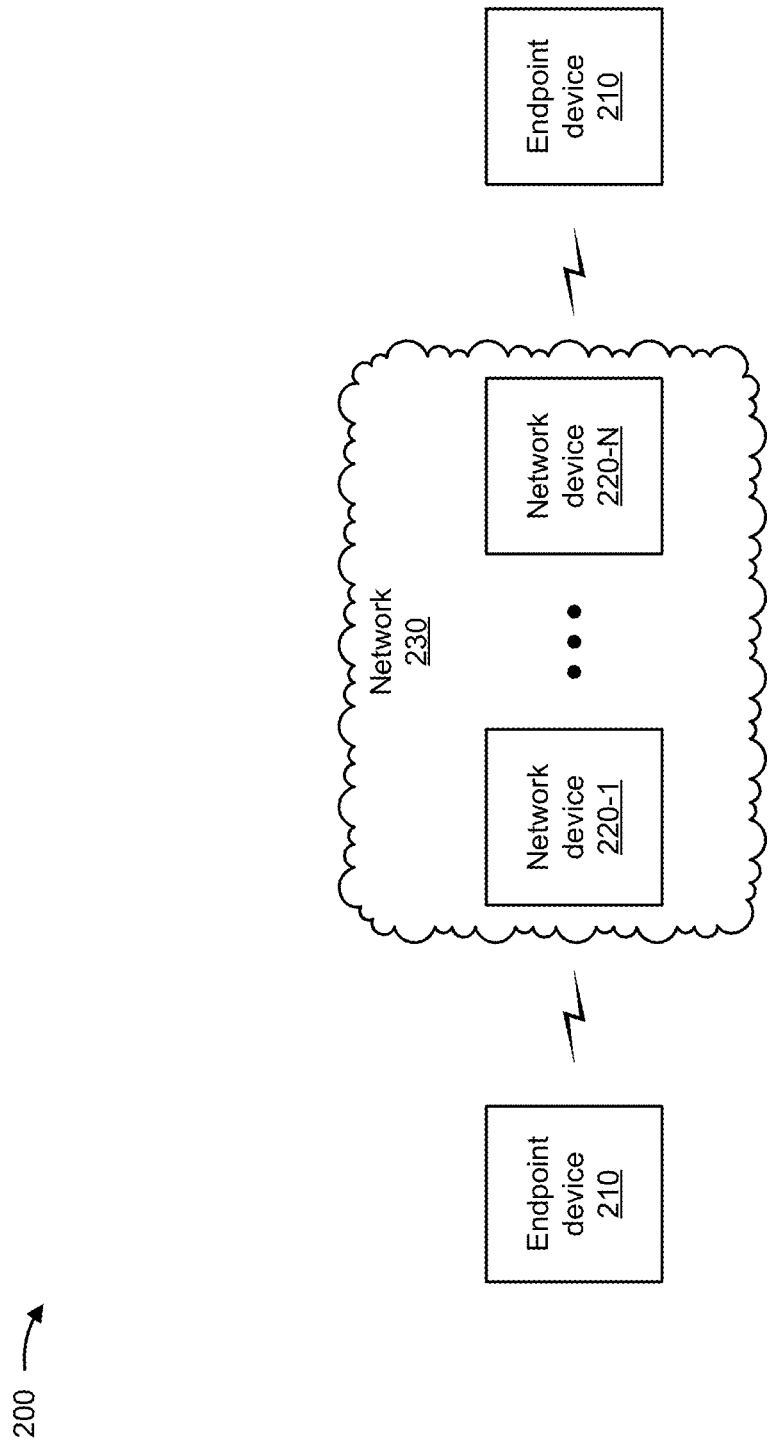
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a network device 220, and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to another endpoint device 210 via network 230 (e.g., by routing packets using network device 220 as an intermediary).

Network device 220 includes one or more devices capable of receiving, processing, storing, routing, and/or providing traffic in a manner described herein. For example, network device 220 may include a router (e.g., a label switching router (LSR), a label edge router (LER), an ingress router, an egress router, a provider router (e.g., a provider edge router, a provider core router, and/or the like), a virtual router, and/or the like), a gateway, a switch, a hub, a bridge, a reverse proxy, a server (e.g., a proxy server, a cloud server, a data center server, and/or the like), a load balancer, a security device, and/or a similar device. In some implementations, network device 220 may be a physical device implemented within a housing, such as a chassis. In some implementations, network device 220 may be a virtual device implemented by one or more computer devices of a cloud computing environment or a data center.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
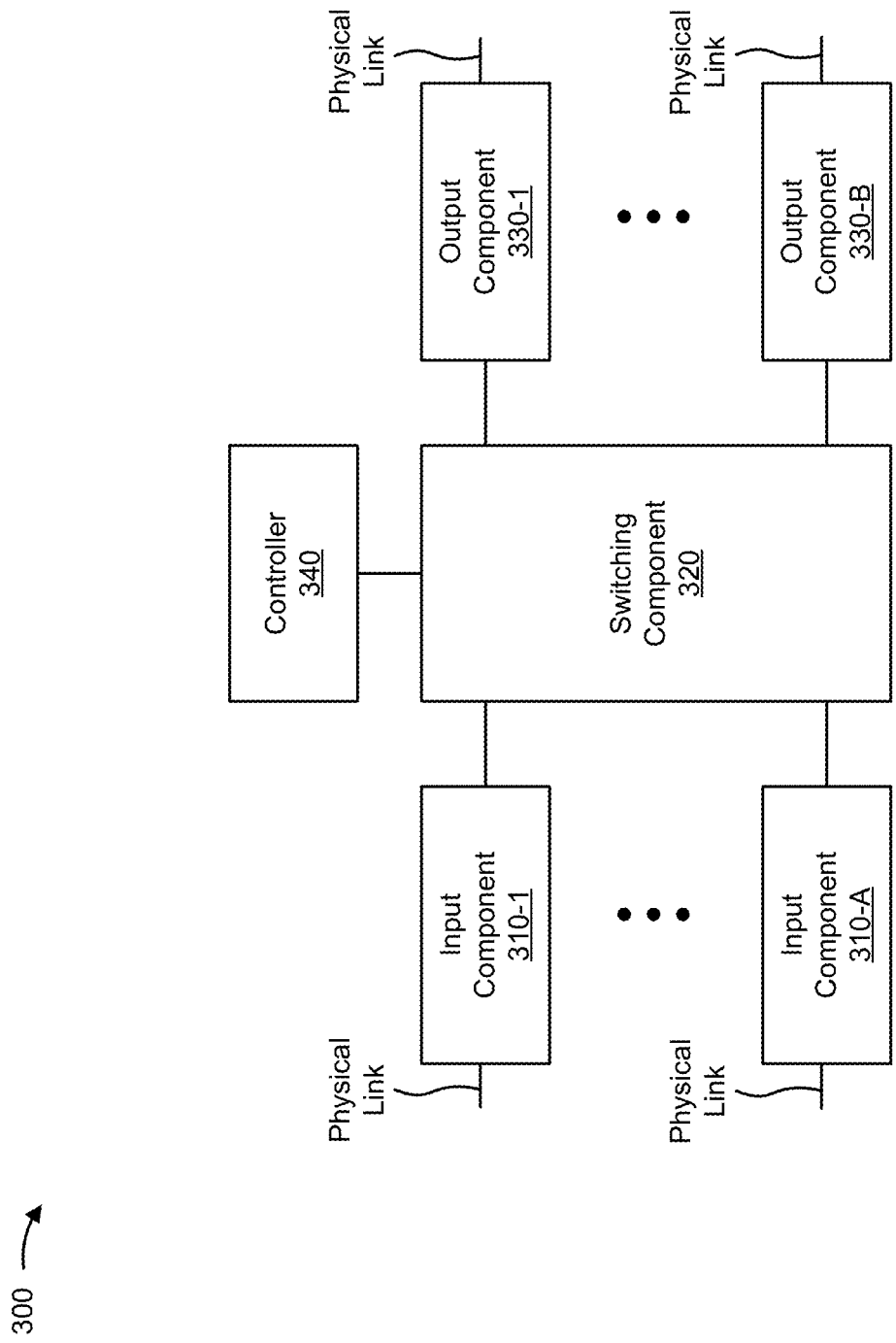
FIG. 3 is a diagram of example components of one or more devices of FIG. 2.

FIG. 3 is a diagram of example components of one or more devices 300 of FIG. 2. Device 300 may correspond to endpoint device 210 and/or network device 220. In some implementations, endpoint device 210 and/or network device 220 may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C (C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 340 may include one or more processors that can be programmed to perform a function.

In some implementations, controller 340 may include a random access memory (RAM), a read only memory (ROM), and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
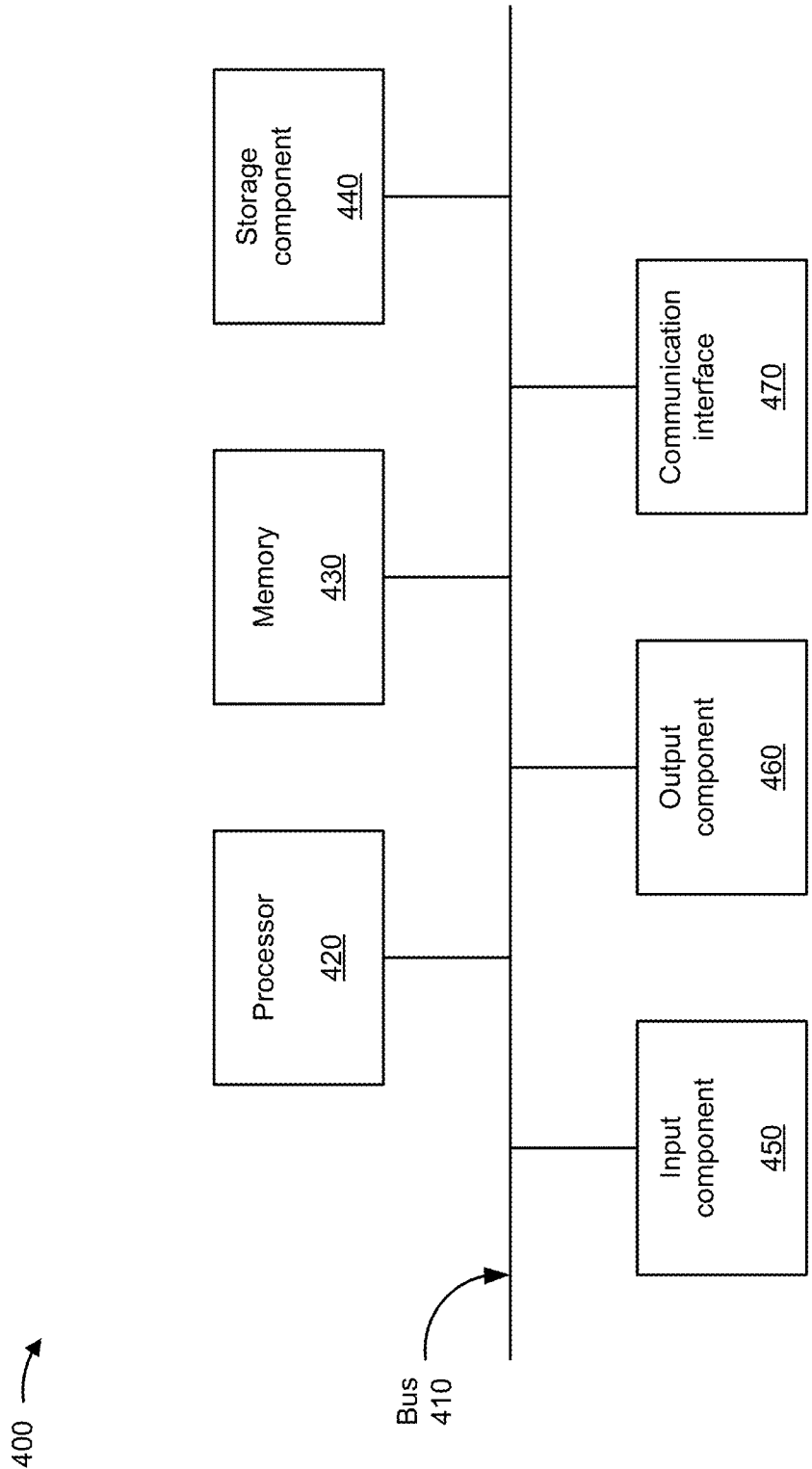
FIG. 4 is a diagram of example components of one or more devices of FIG. 2.

FIG. 4 is a diagram of example components of one or more devices 400 of FIG. 2. Device 400 may correspond to endpoint device 210 and/or network device 220. In some implementations, endpoint device 210 and/or network device 220 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a CPU, a GPU, an APU, a microprocessor, a microcontroller, a DSP, an FPGA, an ASIC, or another type of processing component. In some implementations, processor 420 includes one or more processors capable of being programmed to perform a function. Memory 430 includes a RAM, a ROM, and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more LEDs).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, an RF interface, a universal serial bus (USB) interface, a wireless local area interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
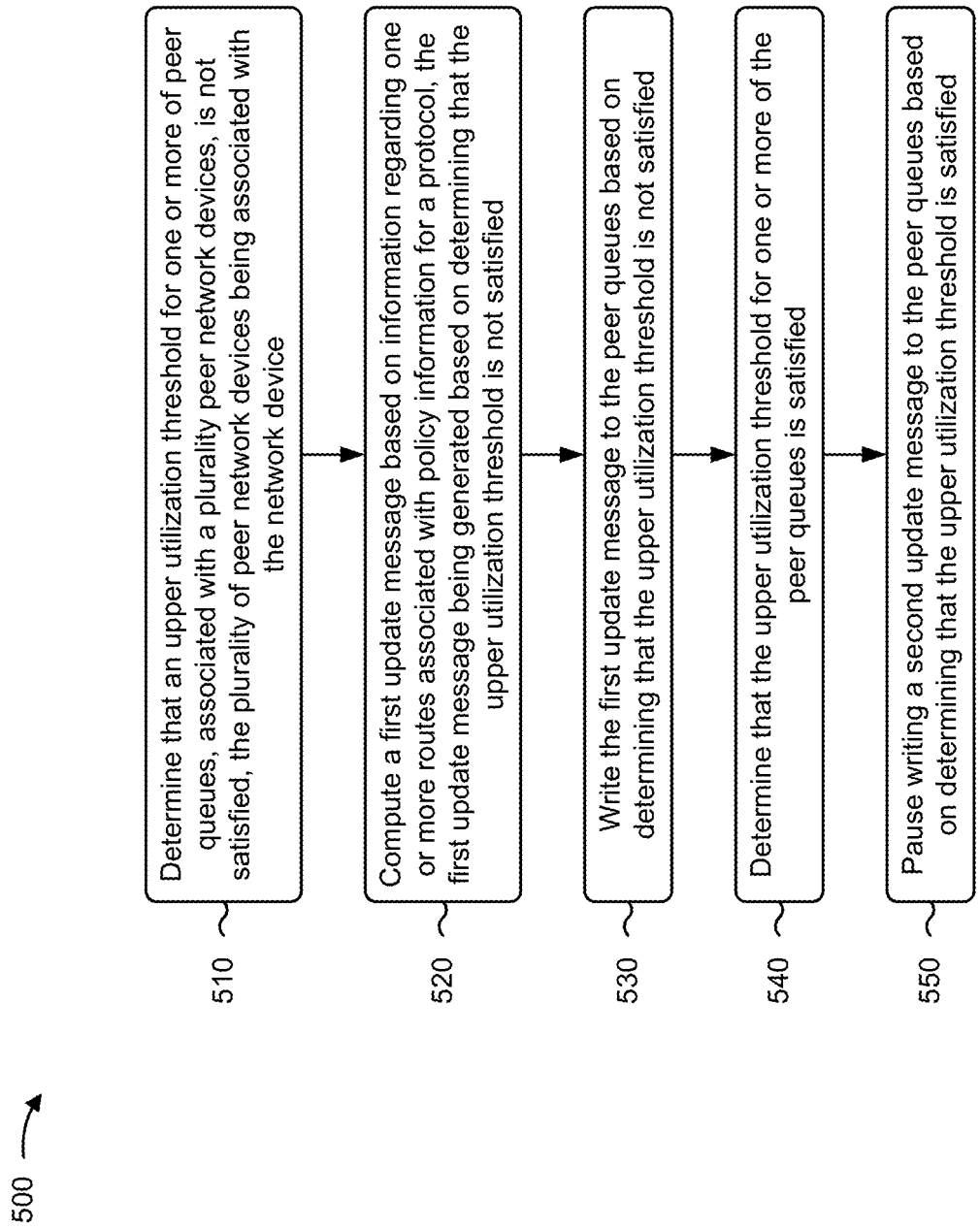

FIG. 5 is a flow chart of an example process 500 associated with regulating enqueueing and dequeuing BGP update messages. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210), and/or the like. Additionally, or alternatively, one or more process blocks of FIG. 5 may be performed by one or more components of a device 300, such as input components 310, switching component 320, and/or output components 330, one or more components of a device 400, such as processor 420, memory 430, storage component 440, input component 450, output component 460, and/or communication interface 470, and/or the like.

As shown in FIG. 5, process 500 may include determining that an upper utilization threshold for one or more of peer queues, associated with a plurality peer network devices, is not satisfied, the plurality of peer network devices being associated with the network device (block 510). For example, the network device may determine that an upper utilization threshold for one or more of peer queues, associated with a plurality peer network devices, is not satisfied, as described above.

As further shown in FIG. 5, process 500 may include computing a first update message based on information regarding one or more routes associated with policy information for a protocol, the first update message being generated based on determining that the upper utilization threshold is not satisfied (block 520). For example, the network device may compute a first update message based on information regarding one or more routes associated with policy information for a protocol, as described above.

As further shown in FIG. 5, process 500 may include writing the first update message to the peer queues based on determining that the upper utilization threshold is not satisfied (block 530). For example, the network device may write the first update message to the peer queues based on determining that the upper utilization threshold is not satisfied, as described above.

As further shown in FIG. 5, process 500 may include determining that the upper utilization threshold for one or more of the peer queues is satisfied (block 540). For example, the network device may determine that the upper utilization threshold for one or more of the peer queues is satisfied, as described above.

As further shown in FIG. 5, process 500 may include pausing writing a second update message to the peer queues based on determining that the upper utilization threshold is satisfied (block 550). For example, the network device may pause writing a second update message to the peer queues based on determining that the upper utilization threshold is satisfied, as described above.

Process 500 may include additional implementations, such as any single implementation or any combination of implementations described below and/or in connection with one or more other processes described elsewhere herein.

In a first implementation, process 500 includes permitting the plurality of peer network devices to obtain data from corresponding ones of the peer queues in a round robin manner.

In a second implementation, alone or in combination with the first implementation, permitting the plurality of peer network devices to obtain the data from the corresponding ones of the peer queues comprises: establishing a plurality of socket connections between the plurality of peer network devices and the corresponding ones of the peer queues, and providing the data from the corresponding ones of the peer queues to the plurality of peer network devices via the plurality of socket connections.

In a third implementation, alone or in combination with one or more of the first and second implementations, the protocol includes a border gateway protocol.

In a fourth implementation, alone or in combination with one or more of the first through third implementations, process 500 includes determining that a lower utilization threshold for the one or more of the peer queues is satisfied; computing the second update message based on the information regarding the one or more routes associated with the policy information, the second is updating message being computed based on determining that the lower utilization threshold is satisfied; and writing the second update message to the peer queues based on determining that the lower utilization threshold is satisfied.

In a fifth implementation, alone or in combination with one or more of the first through fourth implementations, process 500 includes receiving an indication indicating that one or more of the plurality of peer network devices are active; and refraining from writing update messages to the peer queues based on the indication.

In a sixth implementation, alone or in combination with one or more of the first through fifth implementations, process 500 includes receiving another indication indicating that the plurality of peer network devices are inactive; and writing update messages to the peer queues based on the other indication.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
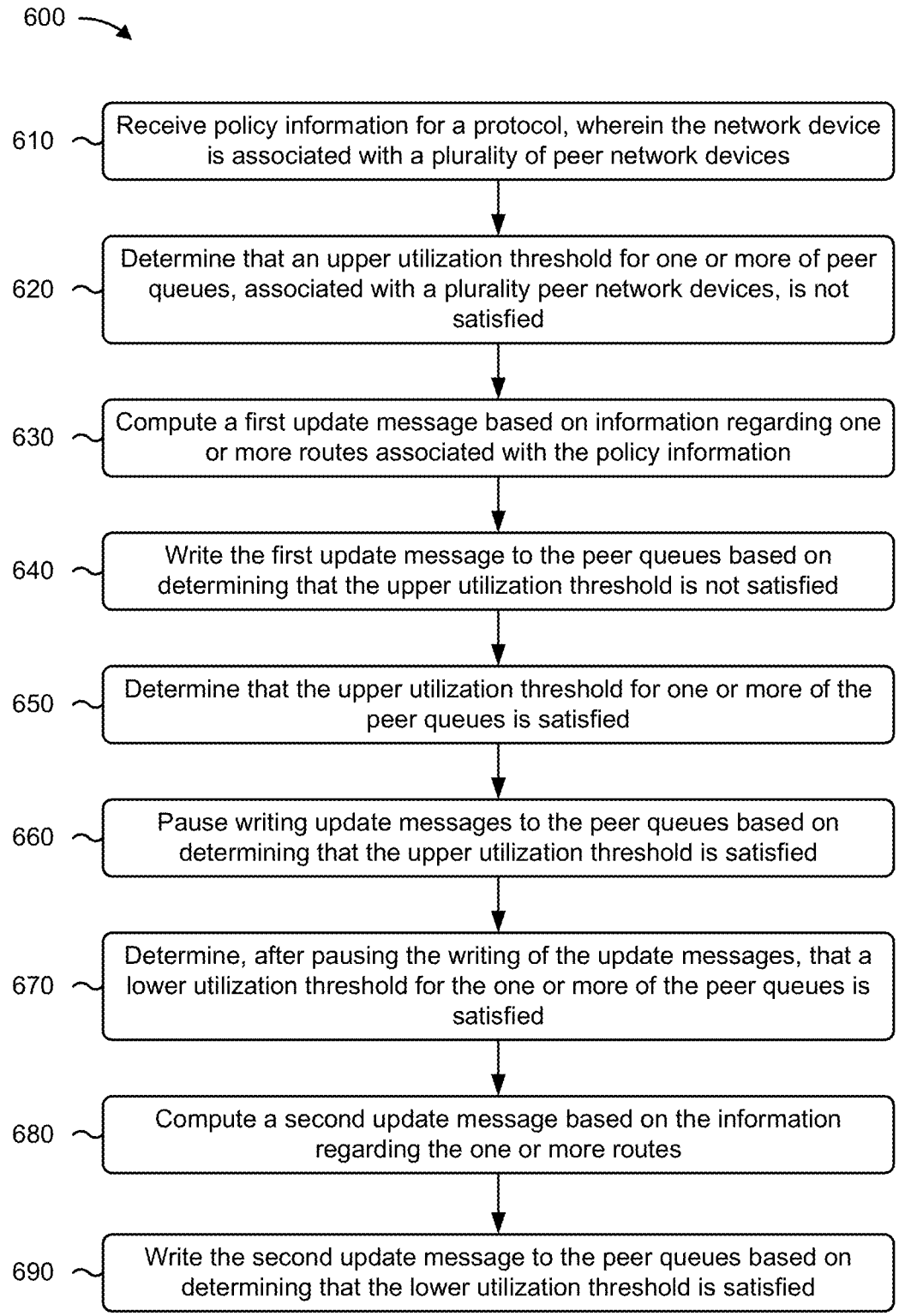

FIG. 6 is a flow chart of an example process 600 associated with regulating enqueueing and dequeuing BGP update messages. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210), and/or the like. Additionally, or alternatively, one or more process blocks of FIG. 6 may be performed by one or more components of a device 300, such as input components 310, switching component 320, and/or output components 330, one or more components of a device 400, such as processor 420, memory 430, storage component 440, input component 450, output component 460, and/or communication interface 470, and/or the like.

As shown in FIG. 6, process 600 may include receiving policy information for a protocol, wherein the network device is associated with a plurality of peer network devices (block 610). For example, the network device may receive policy information for a protocol, as described above. In some implementations, the network device is associated with a plurality of peer network devices.

As further shown in FIG. 6, process 600 may include determining that an upper utilization threshold for one or more of peer queues, associated with a plurality peer network devices, is not satisfied (block 620). For example, the network device may determine that an upper utilization threshold for one or more of peer queues, associated with a plurality peer network devices, is not satisfied, as described above.

As further shown in FIG. 6, process 600 may include computing a first update message based on information regarding one or more routes associated with the policy information (block 630). For example, the network device may compute a first update message based on information regarding one or more routes associated with the policy information, as described above.

As further shown in FIG. 6, process 600 may include writing the first update message to the peer queues based on determining that the upper utilization threshold is not satisfied (block 640). For example, the network device may write the first update message to the peer queues based on determining that the upper utilization threshold is not satisfied, as described above.

As further shown in FIG. 6, process 600 may include determining that the upper utilization threshold for one or more of the peer queues is satisfied (block 650). For example, the network device may determine that the upper utilization threshold for one or more of the peer queues is satisfied, as described above.

As further shown in FIG. 6, process 600 may include pausing writing update messages to the peer queues based on determining that the upper utilization threshold is satisfied (block 660). For example, the network device may pause writing update messages to the peer queues based on determining that the upper utilization threshold is satisfied, as described above.

As further shown in FIG. 6, process 600 may include determining, after pausing the writing of the update messages, that a lower utilization threshold for the one or more of the peer queues is satisfied (block 670). For example, the network device may determine, after pausing the writing of the update messages, that a lower utilization threshold for the one or more of the peer queues is satisfied, as described above.

As further shown in FIG. 6, process 600 may include computing a second update message based on the information regarding the one or more routes (block 680). For example, the network device may compute a second update message based on the information regarding the one or more routes, as described above.

As further shown in FIG. 6, process 600 may include writing the second update message to the peer queues based on determining that the lower utilization threshold is satisfied (block 690). For example, the network device may write the second update message to the peer queues based on determining that the lower utilization threshold is satisfied, as described above.

Process 600 may include additional implementations, such as any single implementation or any combination of implementations described below and/or in connection with one or more other processes described elsewhere herein.

In a first implementation, process 600 includes determining that the upper utilization threshold for a particular peer queue, of the peer queues, is satisfied; increasing a penalty count for the particular peer queue based on the particular peer queue satisfying the upper utilization threshold; determining whether the penalty count satisfies a penalty count threshold; and identifying the particular peer queue as slow when the penalty count for the particular peer queue satisfies the penalty count threshold.

In a second implementation, alone or in combination with the first implementation, process 600 includes enabling update messages to be written to the particular peer queue identified as slow, without pausing, until a BGP update message, advertising a current route of the one or more routes, is written to the particular peer queue.

In a third implementation, alone or in combination with one or more of the first and second implementations, the penalty count for the particular peer queue is reset when the BGP update message, advertising a current route of the one or more routes, is written to the particular peer queue.

In a fourth implementation, alone or in combination with one or more of the first through third implementations, process 600 includes permitting the plurality of peer network devices to obtain data from corresponding ones of the peer queues in a uniform manner to maintain synchronization between the plurality of peer network devices.

In a fifth implementation, alone or in combination with one or more of the first through fourth implementations, the protocol includes a protocol that utilizes transmission control protocol-based applications.

In a sixth implementation, alone or in combination with one or more of the first through fifth implementations, the network device is a producer peer of update messages and the plurality of peer network devices are consumer peers of the update messages produced by the network device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 associated with regulating enqueueing and dequeuing BGP update messages. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210), and/or the like. Additionally, or alternatively, one or more process blocks of FIG. 7 may be performed by one or more components of a device 300, such as input components 310, switching component 320, and/or output components 330, one or more components of a device 400, such as processor 420, memory 430, storage component 440, input component 450, output component 460, and/or communication interface 470, and/or the like.

As shown in FIG. 7, process 700 may include receiving policy information for a protocol, wherein the network device is associated with a plurality of peer network devices (block 710). For example, the network device may receive policy information for a protocol, as described above. In some implementations, the network device is associated with a plurality of peer network devices.

As further shown in FIG. 7, process 700 may include determining that an upper utilization threshold for one or more of peer queues, associated with the plurality of peer network devices, is not satisfied (block 720). For example, the network device may determine that an upper utilization threshold for one or more of peer queues, associated with the plurality of peer network devices, is not satisfied, as described above.

As further shown in FIG. 7, process 700 may include computing a first update message based on information regarding one or more routes associated with the policy information (block 730). For example, the network device may compute a first update message based on information regarding one or more routes associated with the policy information, as described above.

As further shown in FIG. 7, process 700 may include writing the first update message to the peer queues based on determining that the upper utilization threshold is not satisfied (block 740). For example, the network device may write the first update message to the peer queues based on determining that the upper utilization threshold is not satisfied, as described above.

As further shown in FIG. 7, process 700 may include determining that the upper utilization threshold for one or more of the peer queues is satisfied (block 750). For example, the network device may determine that the upper utilization threshold for one or more of the peer queues is satisfied, as described above.

As further shown in FIG. 7, process 700 may include pausing writing a second update message to the peer queues based on determining that the upper utilization threshold is satisfied (block 760). For example, the network device may pause writing a second update message to the peer queues based on determining that the upper utilization threshold is satisfied, as described above.

As further shown in FIG. 7, process 700 may include permitting the plurality of peer network devices to obtain data from corresponding ones of the peer queues in a round robin manner (block 770). For example, the network device may permit the plurality of peer network devices to obtain data from corresponding ones of the peer queues in a round robin manner, as described above.

Process 700 may include additional implementations, such as any single implementation or any combination of implementations described below and/or in connection with one or more other processes described elsewhere herein.

In a first implementation, process 700 includes establishing a plurality of socket connections between the plurality of peer network devices and the corresponding ones of the peer queues; and providing the data from the corresponding ones of the peer queues to the plurality of peer network devices via the plurality of socket connections.

In a second implementation, alone or in combination with the first implementation, process 700 includes determining that a lower utilization threshold for the one or more of the peer queues is satisfied; and writing the second update message to the peer queues based on determining that the lower utilization threshold is satisfied.

In a third implementation, alone or in combination with one or more of the first and second implementations, process 700 includes receiving an indication indicating that one or more of the plurality of peer network devices are active; and refraining from writing update messages to the peer queues based on the indication.

In a fourth implementation, alone or in combination with one or more of the first through third implementations, process 700 includes receiving another indication indicating that the plurality of peer network devices are inactive; and resuming writing update messages to the peer queues based on the other indication.

In a fifth implementation, alone or in combination with one or more of the first through fourth implementations, process 700 includes determining that the upper utilization threshold for a particular peer queue, of the peer queues, is satisfied; increasing a penalty count for the particular peer queue based on the particular peer queue satisfying the upper utilization threshold; determining whether the penalty count satisfies a penalty count threshold; identifying the particular peer queue as slow when the penalty count for the particular peer queue satisfies the penalty count threshold; and enabling update messages to be written to the particular peer queue identified as slow, without pausing, until a BGP update message advertising a current route is written to the particular peer queue.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising: identifying, by a network device, that an upper utilization threshold for a particular peer queue, of a plurality of peer queues associated with a plurality of peer network devices, is satisfied; pausing, by the network device, writing update messages to the-plurality of peer queues based on the upper utilization threshold being satisfied, wherein the upper utilization threshold is based on one or more of: an upper threshold amount of update messages that can be transmitted, over a period of time, by the network device, or an upper threshold amount of update messages that can be received, over the period of time, by the network device, and wherein the update messages are associated with policy information for a protocol; determining, by the network device, that a lower utilization threshold associated with the particular peer queue is satisfied; and writing, by the network device, the update messages to the plurality of peer queues abased on the lower utilization threshold being satisfied, wherein the lower utilization threshold corresponds to a lower threshold amount of update messages stored in the particular peer queue, and wherein the upper utilization threshold is a different than the lower utilization threshold.

2. The method of claim 1, wherein writing the update messages comprises: writing the update messages when the lower utilization threshold is satisfied for each of the plurality of peer network devices for which the upper utilization threshold was satisfied.

3. The method of claim 1, wherein pausing writing the update messages to the plurality of peer queues comprises: determining that the particular peer queue is inactive because a corresponding consumer peer queue is empty.

4. The method of claim 1, wherein pausing writing the update messages to the plurality of peer queues comprises: determining that the particular peer queue is inactive because a corresponding transmission control protocol (TCP) socket is blocked.

5. The method of claim 1, further comprising: permitting the plurality of peer network devices to obtain data from corresponding ones of the plurality of peer queues in a uniform manner to maintain synchronization between the plurality of peer network devices.

6. The method of claim 1, wherein the update messages are based on information regarding one or more routes associated with policy information for a border gateway protocol.

7. A network device, comprising: one or more memories; and one or more processors to: pause writing update messages to a plurality of peer queues associated with a plurality of peer network devices based on an upper utilization threshold for a particular peer queue, of the plurality of peer queues, being satisfied, wherein the upper utilization threshold is based on one or more of: an upper threshold amount of update messages that can be transmitted, over a period of time, by the network device; or an upper threshold amount of update messages that can be received, over the period of time, by the network device; determine that a lower utilization threshold associated with the particular peer queue is satisfied; and resume writing the update messages to the plurality of peer queues based on the lower utilization threshold being satisfied, wherein the lower utilization threshold corresponds to a lower threshold amount of update messages stored in the particular peer queue, and wherein the upper utilization threshold is a different than the lower utilization threshold.

8. The network device of claim 7, wherein the one or more processors are further to: compute the update messages based on information regarding one or more routes associated with policy information for a protocol.

9. The network device of claim 7, wherein the one or more processors are further to: permit the plurality of peer network devices to obtain data from corresponding ones of the plurality of peer queues in a round robin manner.

10. The network device of claim 7, wherein the one or more processors are further to: establish a plurality of socket connections between the plurality of peer network devices and corresponding ones of the plurality of peer queues; and provide data from the corresponding ones of the peer queues to the plurality of peer network devices via the plurality of socket connections.

11. The network device of claim 7, wherein the one or more processors, to pause writing the update messages to the plurality of peer queues, are to: determine that the particular peer queue is inactive because a corresponding consumer peer queue is empty.

12. The network device of claim 7, wherein the one or more processors, to pause writing the update messages to the plurality of peer queues, are to: determine that the particular peer queue is inactive because a corresponding transmission control protocol (TCP) socket is blocked.

13. The network device of claim 7, wherein the one or more processors, to resume writing the update messages, are to: resume writing the update messages when the lower utilization threshold is satisfied and the upper utilization threshold is no longer satisfied.

14. A non-transitory computer-readable medium storing instructions, the instructions comprising: one or more instructions that, when executed by one or more processors of a network device, cause the one or more processors to: pause writing update messages to a plurality of peer queues associated with a plurality of peer network devices, based on an upper utilization threshold for a particular peer queue, of the plurality of peer queues, being satisfied, wherein the upper utilization threshold is based on one or more of: an upper threshold amount of update messages that can be transmitted, over a period of time, by the network device, or an upper threshold amount of update messages that can be received, over the period of time, by the network device, and wherein the update messages are associated with policy information for a protocol; determine that a lower utilization threshold associated with the particular peer queue is satisfied; and write the update messages to the plurality of peer queues based on the lower utilization threshold associated with the particular peer queue being satisfied, wherein the lower utilization threshold corresponds to a lower threshold amount of update messages stored in the particular peer queue, and wherein the upper utilization threshold is different than the lower utilization threshold.

15. The non-transitory computer-readable medium of claim 14, wherein the one or more instructions, when executed by the one or more processors, further cause the one or more processors to: compute the update messages based on information regarding one or more routes associated with the policy information for a border gateway protocol.

16. The non-transitory computer-readable medium of claim 14, wherein the one or more instructions, when executed by the one or more processors, further cause the one or more processors to: permit the plurality of peer network devices to obtain data from corresponding ones of the plurality of peer queues in a round robin manner.

17. The non-transitory computer-readable medium of claim 14, wherein the one or more instructions, that cause the one or more processors to write the update messages, cause the one or more processors to: resume writing the update messages when the lower utilization threshold is satisfied and the upper utilization threshold is no longer satisfied.

18. The non-transitory computer-readable medium of claim 14, wherein the one or more instructions, that cause the one or more processors to pause writing the update messages to the plurality of peer queues, cause the one or more processors to: determine that the particular peer queue is inactive because a corresponding consumer peer queue is empty.

19. The non-transitory computer-readable medium of claim 14, wherein the one or more instructions, that cause the one or more processors to pause writing the update messages to the plurality of peer queues, cause the one or more processors to: determine that the particular peer queue is inactive because a corresponding transmission control protocol (TCP) socket is blocked.

* * * * *